US007853622B1

(12) United States Patent
Baluja et al.

(10) Patent No.: US 7,853,622 B1
(45) Date of Patent: Dec. 14, 2010

(54) VIDEO-RELATED RECOMMENDATIONS USING LINK STRUCTURE

(75) Inventors: Shumeet Baluja, Santa Clara, CA (US); Yushi Jing, Mountain View, CA (US); Dandapani Sivakumar, Cupertino, CA (US); Jay Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 375 days.

(21) Appl. No.: 11/933,676

(22) Filed: Nov. 1, 2007

(51) Int. Cl.
*G06F 17/30* (2006.01)

(52) U.S. Cl. .................. 707/803; 707/713; 707/714; 707/716; 707/731; 707/796; 707/798; 707/E17.009; 707/999.1; 707/999.101; 707/999.104

(58) Field of Classification Search .............. None
See application file for complete search history.

(56) References Cited

U.S. PATENT DOCUMENTS

| 5,724,521 | A  | 3/1998  | Dedrick        |
| 5,740,549 | A  | 4/1998  | Reilly et al.  |
| 5,848,397 | A  | 12/1998 | Marsh et al.   |
| 5,918,014 | A  | 6/1999  | Robinson       |
| 5,948,061 | A  | 9/1999  | Merriman       |
| 6,026,368 | A  | 2/2000  | Brown et al.   |
| 6,044,376 | A  | 3/2000  | Kurtzman, II   |
| 6,078,914 | A  | 6/2000  | Redfern        |
| 6,144,944 | A  | 11/2000 | Kurtzman et al.|
| 6,167,382 | A  | 12/2000 | Sparks et al.  |
| 6,256,648 | B1 | 7/2001  | Hill et al.    |
| 6,269,361 | B1 | 7/2001  | Davis et al.   |
| 6,389,372 | B1 | 5/2002  | Glance et al.  |
| 6,401,075 | B1 | 6/2002  | Mason et al.   |
| 6,549,896 | B1 | 4/2003  | Candan et al.  |
| 6,594,673 | B1 | 7/2003  | Smith et al.   |

(Continued)

FOREIGN PATENT DOCUMENTS

EP        1 544 729        6/2005

(Continued)

OTHER PUBLICATIONS

Baluja et al., ideo suggestion and discover for YouTube: Taking random walks through the view graph:, in *Proc. 17th International World Wide Web Conference (WWW)*, 2008 to appear.

(Continued)

*Primary Examiner*—Don Wong
*Assistant Examiner*—Andalib F Lodhi
(74) *Attorney, Agent, or Firm*—Fish & Richardson P.C.

(57) ABSTRACT

The subject matter of this specification can be embodied in, among other things, a method that includes inferring labels for videos, users, advertisements, groups of users, and other entities included in a social network system. The inferred labels can be used to generate recommendations such as videos or advertisements in which a user may be interested. Inferred labels can be generated based on social or other relationships derived from, for example, profiles or activities of social network users. Inferred labels can be advantageous when explicit information about these entities is not available. For example, a particular user may not have clicked on any online advertisements, so the user is not explicitly linked to any advertisements.

22 Claims, 20 Drawing Sheets

U.S. PATENT DOCUMENTS

| | | |
|---|---|---|
| 6,792,419 B1 | 9/2004 | Raghavan |
| 6,985,882 B1 | 1/2006 | Del Sesto |
| 7,039,599 B2 | 5/2006 | Merriman |
| 7,136,875 B2 | 11/2006 | Anderson et al. |
| 7,689,682 B1 | 3/2010 | Eldering et al. |
| 2002/0023230 A1 | 2/2002 | Bolnick et al. |
| 2002/0116466 A1 | 8/2002 | Trevithick et al. |
| 2002/0120506 A1 | 8/2002 | Hagen |
| 2002/0124053 A1 | 9/2002 | Adams et al. |
| 2003/0050977 A1 | 3/2003 | Puthenkulam et al. |
| 2004/0042599 A1 | 3/2004 | Zaner et al. |
| 2004/0088325 A1 | 5/2004 | Elder et al. |
| 2004/0122803 A1 | 6/2004 | Dom et al. |
| 2004/0143841 A1 | 7/2004 | Wang et al. |
| 2004/0148275 A1 | 7/2004 | Achlioptas |
| 2004/0215793 A1 | 10/2004 | Ryan et al. |
| 2004/0267604 A1* | 12/2004 | Gross .................. 705/10 |
| 2005/0091202 A1 | 4/2005 | Thomas |
| 2005/0114325 A1 | 5/2005 | Liu et al. |
| 2005/0125308 A1 | 6/2005 | Puentes et al. |
| 2005/0125408 A1 | 6/2005 | Somaroo et al. |
| 2005/0144069 A1 | 6/2005 | Wiseman et al. |
| 2005/0149395 A1 | 7/2005 | Henkin et al. |
| 2005/0154639 A1 | 7/2005 | Zetmeir |
| 2005/0171832 A1 | 8/2005 | Hull et al. |
| 2005/0198031 A1 | 9/2005 | Pezaris et al. |
| 2005/0216300 A1 | 9/2005 | Appelman et al. |
| 2005/0278443 A1 | 12/2005 | Winner et al. |
| 2006/0004704 A1 | 1/2006 | Gross |
| 2006/0031121 A1 | 2/2006 | Speicher |
| 2006/0085259 A1 | 4/2006 | Nicholas et al. |
| 2006/0136098 A1 | 6/2006 | Chitrapura et al. |
| 2006/0165040 A1 | 7/2006 | Rathod et al. |
| 2006/0184617 A1 | 8/2006 | Nicholas et al. |
| 2006/0190225 A1 | 8/2006 | Grand |
| 2006/0200435 A1 | 9/2006 | Flinn et al. |
| 2006/0204142 A1 | 9/2006 | West et al. |
| 2006/0218577 A1 | 9/2006 | Goodman et al. |
| 2006/0247940 A1 | 11/2006 | Zhu et al. |
| 2006/0248573 A1 | 11/2006 | Pannu et al. |
| 2006/0271460 A1 | 11/2006 | Hanif |
| 2006/0282328 A1 | 12/2006 | Gerace et al. |
| 2006/0294134 A1 | 12/2006 | Berkhim et al. |
| 2007/0005341 A1 | 1/2007 | Burges et al. |
| 2007/0043688 A1 | 2/2007 | Kountz et al. |
| 2007/0043766 A1 | 2/2007 | Nicholas et al. |
| 2007/0050446 A1 | 3/2007 | Moore |
| 2007/0106551 A1 | 5/2007 | McGucken |
| 2007/0121843 A1 | 5/2007 | Atazky et al. |
| 2007/0124721 A1 | 5/2007 | Cowing et al. |
| 2007/0218900 A1 | 9/2007 | Abhyanker |
| 2008/0010275 A1 | 1/2008 | Lee et al. |
| 2008/0091834 A1* | 4/2008 | Norton .................. 709/229 |
| 2008/0103784 A1 | 5/2008 | Wong et al. |
| 2008/0103877 A1 | 5/2008 | Gerken |
| 2008/0104079 A1 | 5/2008 | Craig |
| 2008/0104225 A1* | 5/2008 | Zhang et al. .................. 709/224 |
| 2008/0120308 A1* | 5/2008 | Martinez et al. ............ 707/100 |
| 2008/0120411 A1 | 5/2008 | Eberle |
| 2008/0126476 A1 | 5/2008 | Nicholas et al. |
| 2008/0140650 A1 | 6/2008 | Stackpole |
| 2008/0155080 A1 | 6/2008 | Marlow et al. |
| 2008/0159590 A1 | 7/2008 | Yi et al. |
| 2008/0162431 A1 | 7/2008 | Xu et al. |
| 2008/0195657 A1* | 8/2008 | Naaman et al. .......... 707/104.1 |
| 2008/0215416 A1 | 9/2008 | Ismalon et al. |
| 2008/0243607 A1 | 10/2008 | Rohan et al. |
| 2008/0249966 A1 | 10/2008 | Luege Mateos |
| 2008/0275899 A1 | 11/2008 | Baluja et al. |
| 2009/0024548 A1 | 1/2009 | Zhu et al. |
| 2009/0063284 A1 | 3/2009 | Turpin et al. |
| 2009/0076800 A1 | 3/2009 | Li et al. |
| 2009/0112701 A1 | 4/2009 | Turpin et al. |

FOREIGN PATENT DOCUMENTS

| | | |
|---|---|---|
| JP | 11-265369 | 9/1999 |
| JP | 2002-132604 | 5/2002 |
| WO | WO 97/21183 | 6/1997 |
| WO | WO 00/68860 | 11/2000 |
| WO | WO 2004/111771 | 12/2004 |
| WO | WO 2006/121575 | 11/2006 |

OTHER PUBLICATIONS

Bay et al., "surf: Speeded up robust features", in *Proc. 9th International European Conference on Computer Vision (ECCV)*, pp. 404-417, 2006.

Belongie et al, "Shape matching and object recognition using shape contexts", *IEEE Transactions on Pattern Analysis and Machine Intelligence (TPAMI)*, vol. 24, No. 24, pp. 509-522, 2002.

Carson et al., "Blob-world: image segmentation using expectation-maximization and its application to image querying", *IEEE transactions on Pattern Analysis and Machine Intelligence (TPAMI)*, vol. 24, No. 8, pp. 1026-1038, 2002.

D.G. Lowe, "Distinctive Image Features from Scale-Invariant Keypoints", *International Journal of Computer Vision (IJCV)*, vol. 60, No. 2, pp. 91-110, 2004.

Datar et al., Locality-sensitive hashing scheme based on p-stable distributions:, in *Proc. 20th Symposium on Computational Geometry (SGC)*, pp. 253-262, 2004.

Fergus et al., "A visual category filter for Google images," in *Proc. 8th European Conference on Computer Vision (ECCV)*, pp. 242-256, 2004.

Fergus et al., "Object class recognition by unsupervised scale-invarint learning" in *Proc. Conference on Computer Vision and Pattern Recognition (CVPR)*, vol. 2, pp. 264-271, 2003.

Frey et al., "clustering by passing messages between data points", *Science*, vol. 315, pp. 972-276, 2007.

Friedman et al., Bayesian network classifiers *Machine Learning*, vol. 29, pp. 131-163, 1997.

Frome et al., "Learning globally-consistent local distance functions for shape-based image retrieval and classification", in *Proc. 11th IEEE International Conference on Computer Vision (ICCV)*, pp. 1-8, 2007.

Harris et al., "A combine corner and edge detector", in *Proc. 4th Alvey Vision Conference*, pp. 147-151, 1988.

He et al., "Imagerank: spectral techniques for structural analysis of image database", in *Proc. International Conference on Multimedia and Expo*, vol. 1, pp. 25-28, 2002.

Hsu et al., "Video search reranking through random walk over document-level context graph" in *Proc. 15th International Conference on Multimedia*, pp. 971-980, 2007.

Indyk et al., "Approximate nearest neighbor-towards removing the curse of dimensionality", in *Proc. 30th ACM Symp. On Computational Theory*, pp. 604-613, 1998.

J.M. Kleinberg, "Authoritative sources in a hyperlinked environment", *Journal of the ACM*, vol. 46, No. 5, pp. 604-632, 1999.

Jing et al., "Canonical image selection from the web", in *Proc. 6th International Conference on Image and Video Retrieval (CIVR)*, pp. 280-287, 2007.

Jing et al., "VisualRank: Applying PageRank to Large-Scale Image Search".

Joshi et al., "The story picturing engine—a system for automatic text illustration", *ACM Transactions on Multimedia, Computing, Communications and Applications*, vol. 2, No. 1, pp. 68-89, 2006.

Ke et al., "Efficient near-duplicate detection and sub-image retrieval", in *Proc. ACM International Conference on Multimedia (ACM MM)*, pp. 869-876, 2004.

Ke et al., "Pca-sift: A more distinctive representation for local image descriptors", in *Proc. Conference on Computer Vision and Pattern Recognition (DVPR)*, vol. 2, pp. 506-516, 2004.

Kondor et al., "Diffusion kernels on graphs and other discrete structures", in *Proc. 19th International Conference on Machine Learning (ICML)*, pp. 315-322, 2002.

Lazebnik et al., À sparse texture representation using affine-invariant regions, in *Proc. Conference on Computer Vision and Pattern Recognition (CVPR)*, vol. 2, pp. 319-324, 2003.

Ma et al., "A toolbox for navigating large image databases", *Multimedia System*, vol. 3, No. 7, pp. 184-198, 1999.

Mikolajczyk et al., "A performance evaluation of local descriptors", *IEEE Transactions on Pattern Analysis and Machine Intelligence (TPAMI)*, vol. 27, No. 10, pp. 1615-1630, 2005.

Nister et al., "Scalable recognition with a vocabulary tree", in *Proc. Conference on Computer vision and Pattern Recognition (CVPR)*, vol. 2, pp. 2161-2168, 2006.

Nowak et al., "Learning visual similarity measures for comparing never seen objects", in *Proc. Conference on Computer Vision and Pattern Recognition (CVPR)*, 2007.

P. Indyk, "Stable distributions, pseudorandom generators, embeddings, and data stream computation", in *Proc. 41st IEEE Symposium on Foundations of Computer Science (FOCS)*, pp. 189-197, 2000.

Park et al., "Majority based ranking approach in web image retrieval", *Lecture Notes in Computer Science*, vol. 27-28, pp. 499-504, 2003.

Pentland et al., "Content-based manipulation of image databases", *International Journal of Computer Vision (IJCV)*, vol. 18, No. 3, pp. 233-254, 1996.

Philbin et al., "Object retrieval with large vocabularies and fast spatial matching", in *Proc. Conference on Computer Vision and Pattern Recognition (CVPR)*, 2007.

R. Datta et al., "Image retrieval: Ideas, influences, and trends of the new age", *ACM Computing Surveys*, vol. 40. No. 2, 2008.

Schindler et al., "city-scale location recognition", in *Proc. Conference on Computer Vision and Pattern Recognition (CVPR)*, 2007.

Simon et al., "Scene summarization for online image collections", in *Proc. 12th International Conference on Computer Vision (ICCV)*, 2007.

Smeulders et al., "Content-based image retrieval at the end of the early years", *IEEE Transactions on Pattern Analysis and Machine Intelligence (TPAMI)*, vol. 22, No. 12, pp. 1349-1380, 2000.

Uchihashi et al., "Content-free image retrieval by combinations of keywords and user feedbacks", in *Proc. 5th International Conference on Image and Video Retrieval (CIVR)*, pp. 650-659, 2005.

Weinberger et al., "Distance metric learning for large margin nearest neighbor classification", in *Proc. 18th Conference on Advances in Neural Information Processing Systems (NIPS)*, vol. 18, pp. 1437-1480, 2006.

Winder et al., "Learning local image descriptors", in *Prof. Conference on Computer Vision and Pattern Recognition (CVPR)*, 2007.

Xing et al., "Distance metric learning, with applications to clustering with side-information", in *Proc. 15th Conference on Advances in Neural Information Processing Systems (NIPS)*, vol. 15, pp. 450-459, 2002.

Brin and Page, "The Anatomy of a Large-Scale Hypertextual Web Search Engine," *Computer Networks*, 1998, pp. 1-26.

Chakrabarti et al., "Mining the Web's Link Structure," *IEEE Computer Magazine*, 1999, pp. 60-67.

Press Releases Facebook "Leading Websites Offer Facebook Beacon for Social Distribution" [online] [retrieved from the internet: http://www.facebook.com/press/releases.php?p9166 ] [retrieved on Jan. 24, 2008] 1 page.

Haveliwala, "Topic-Sensitive PageRank," *IEEE Transactions on Knowledge and Data Engineering*, 2003, 10 pages.

Herlocker et al., "Evaluating Collaborative Filtering Recommender Systems," *ACM Transactions on Information Systems*, 2004, 22(1):5-53.

Indyk, "Stable Distributions, Pseudorandom Generators, Embeddings, and Data Stream Computation," *Proc. 41st IEEE Symposium on Foundations of Computer Science (FOCS)*, pp. 189-197, 2000.

Kleinberg et al., "The Web as a graph: measurements, models, and methods," *Proc International Conference on Combinatronics*, 1999, 18 pages.

Konstan et al., "GroupLens: Applying Collaborative Filtering to Usenet News," *Communications of the ACM*, Mar. 1997, 40(3):77-87.

Liu et al., "A Comparative Study on Feature selection and Classification methods Using Gene Expression Profiles and Proteomic Patterns," *Genome Informatics* 13:, pp. 51-60, 2002.

Pilászy, "Text Categorization and Support Vector Machines," *Computer Science*, 1998, vol. 1398, 10 pages.

Sebastiani, "Machine Learning in Automated Text Categorization," *ACM Computing Surveys*, 2002, 34(1):1-47.

U.S. Appl. No. 95/001,061, Reexam of Stone.

U.S. Appl. No. 95/001,068, Reexam of Stone.

U.S. Appl. No. 95/001,069, Reexam of Stone.

U.S. Appl. No. 95/001,073, Reexam of Stone.

Accounts, at http://www.cs.rice.edu/~ssiyer/accounts/, as available via the Internet and printed on Jul. 29, 2004.

Adamic et al., "A Social Network Caught in the Web," at http://firstmonday.org/issues/issue8_6/adamic/, as available via the Internet and printed on Jul. 28, 2004.

AdForce, Inc., A Complete Guide to AdForce, Version 2.6, 1998.

AdForce, Inc., S-1/A SEC Filing, May 6, 1999.

AdKnowledge Campaign Manager: Reviewer's Guide, AdKnowledge, Aug. 1998.

AdKnowledge Market Match Planner: Reviewer's Guide, AdKnowledge, May 1998.

AdStar.com website archive from www.Archive.org, Apr. 12, 1997, and Feb. 1, 1997.

Amazon.com, "Selling at Amazon Marketplace," at http://pages.amazon.com/exec/obidos/tg/browse/-/1161234/rcf=hp_hp_is_4_2/002-283572 as available via the Internet and printed on Jul. 29, 2004.

Amazon.com, "New Seller FAQ," at http://pages.amazon.com/exec/obidos/tg/browse/-/1161274/002-2835726-5513622 as available via the Internet and printed on Jul. 29, 2004.

Azran, "The Rendezvous Algorithm: Multiclass Semi-Supervised Learning with Markov Random Walks," *ICML*, 2007, 8 pages.

Baluja and Rowley, *Intl J Computer Vision*, 2007, 71(1): at http://portal.acm.org/toc.cfm?id=J325&type=periodical&coll=&dl=ACM&CFID=15151515&CFTOKEN=6184618.

Baseview Products, Inc., AdManager Pro Administrator's Manual v. 2.0, Jun. 1998.

Baseview Products, Inc., ClassManagerPro Administration and Receivables Manual v. 1.0.5, Feb. 1, 1997.

Boccaletti et al., "Complex Networks: Structure and Dynamics," *Physics Reports*, 2006, 424:175-308.

Business Wire, "Global Network, Inc. Enters Into agreement in Principle with Major Advertising Agency," Oct. 4, 1999.

Dalal and Triggs, "Histograms of Oriented Gradients for Human Detection," *Proc IEEE Conf Computer Vision and Pattern Recognition*, Jun. 2005, pp. 886-893.

Datta et al., "Image retrieval: Ideas, influences, and trends of the new age," *ACM Computing Surveys*, 2008, 40(2).

Dedrick, Interactive Electronic Advertising, IEEE, 1994, pp. 55-66.

Dedrick, A Consumption Model for Targeted Electronic Advertising, Intel Architecture Labs, IEEE, 1995, pp. 41-49.

Dellaert et al., "Mixture Trees for Modeling and Fast Conditional Sampling with Applications in Vision and Graphics," *Proc IEEE Conf Computer Vision and Pattern Recognition*, 2005 at http://www.cs.unc.edu/~kwatra/publications/cvpr05-mixtree.pdf.

Doctorow, "Running Notes from Revenge of the User: Lessons from Creator/User Battles," at http://craphound.com/danahetcon04.xt, as available via the Internet and printed Jul. 28, 2004.

Ebay.com, "What is eBay?" at http://pages.ebay.com/help/welcome/questions/about-ebay.html as available via the Internet and printed on Jul. 29, 2004.

Ebay.com, "How to Bid," at http://pages.ebay.com/help/welcome/bid.html as available via the Internet and printed on Jul. 29, 2004.

Ebay.com, "How to Sell," at http://pages.ebay.com/help/welcome/sell.html as available via the Internet and printed on Jul. 29, 2004.

Gibson et al., "Inferring Web Communities from Link Topology," *Proc 9th ACM Conference on Hypertex and Hypermedia*, 1998, 10 pages.

Gionis et al., "Similarity Search in High Dimensions via Hashing," *Proc 25th Very Large Database Conf*, 1999 at people.csail.mit.edu/indyk/vldb99.ps.

Glance et al., "Knowledge Pump: Supporting the Flow and Use of Knowledge," *Information Technology for Knowledge Management*, 1997, Borghoff and Pareschi (eds.), Springer Verlag, 22 pages.

Grauman and Darrell, "The Pyramid Match Kernel: Discriminative Classification with Sets of Image Features," *ICCV 2005* at http://people.csail.mit.edu/kgrauman/jobapp/kgrauman_sample_papers.pdf.

Information Access Technologies, Inc., Aaddzz brochure, "The best Way to Buy and Sell Web Advertising Space," 1997.

Information Access Technologies, Inc., Aaddzz.com website archive from www.Archive.org, archived on Jan. 30, 1998.

Jeh and Widom, "SimRank: A Measure of Structural-Context Similarity," *Proc 8th ACM SIGKDD international conference on knowledge discovery and data mining*, Jul. 2002, pp. 538-543.

Joachims, "Text Categorization with Support Vector Machines: Learning with Many Relevant Features," *Proc 10th European Conf on Machine Learning*, 1998, pp. 137-142.

Kautz et al., "ReferralWeb: Combining Social Networks and Collaborative Filtering," *Communications of the ACM*, 1997, 40(3):1-4.

Leigh et al., "Transformation, Ranking, and Clustering for Face Recognition Algorithm Comparison," at http://www.itl.nist.gov/div898/itperf/renorm.pdf.

Liew et al., "Social Networks," U.S. Appl. No. 60/552,718, filed Mar. 15, 2004, 9 pages.

Liu et al., "An Investigation of Practical Approximate Nearest Neighbor Algorithms," *Proc Neural Information Processing Systems*, 2004 at http://www.cs.cmu.edu/~tingliu/research.htm.

Lowe, "Local Feature View Clustering for 3D Object Recognition," *CVPR 2001*, at http:/www.cs.ubc.ca/~lowe/papers/cvpr01.pdf.

Microsoft Corporation, "Is Friendster the 'Next Big Thing'?" at http://mobilemomentum.msn.com/article.aspx?aid=4, as available via the Internet and printed on Jul. 29, 2004.

Monay and Gatica-Perez, "On Image Auto-Annotation with Latent Space Models," *MM'03*, Nov. 2-8, 2003.

Multiply, "About Multiply," at http://multiply.com/info/about, as available via the Internet and printed on May 3, 2004.

Multiply, "Help," at http://multiply.com/info/help, as available via the Internet and printed on May 3, 2004.

Multiply, "Multiply Privacy Policy," at http://multiply.com/info/privacy, as available via the Internet and printed on May 3, 2004.

Multiply, "Multiply Terms of Service," at http://multiply.com/info/tos, as available via the Internet and printed on May 3, 2004.

Roach et al., "Video Genre Classification Using Dynamics," 2001, *Proc Acoustics, Speech, and Signal Processing on IEEE Intl Conference*, pp. 1557-1560.

Rothganger et al., "3D Object Modeling and Recognition Using Affine-Invariant Patches and Multi-View Spatial Constraints," *CVPR 2003*, at http://vasc.ri.emu.edu/~hebert/04AP/fred_cvpr03.pdf.

Rowley et al., "Neural Network-Based Face Detection," *IEEE Transactions on Pattern Analysis and Machine Intelligence*, 1998, 20(1).

Sullivan, Danny, "Is It Really Personalized Search?" http://searchenginewatch.com printed on May 13, 2004.

Szummer and Jaakkola, "Partially labeled classification with Markov random walks," *NIPS 2001*.

Tribe.net, "Listings Directory," at http://www.tribe.net/tribe/servlet/template/pub.Listings.vm, as available via the Internet and printed on Jun. 28, 2004.

Viola and Jones, "Robust Real Time Face Detection," *Int J Computer Vision*, 2004 at http://scholar.google.com/scholar?hl=en&lr=&cluster=10098362814192689387.

Wang et al., "AnnoSearch: Image Auto-Annotation by Search," *CVPR 2006*.

Yang et al., "Mining Social Networks for Targeted Advertising," *Proceedings of the 39th Hawaii International Conference on System Sciences*, 2006.

Yang and Pedersen, "A Comparative Study on Feature Selection in Text Categorization Source," *Proc 14th Intl Conf Machine Learning*, 1997, pp. 412-420.

Zeff et al., *Advertising on the Internet*, 2nd ed., John Wiley & Sons, 1999.

Zhou and Schölkopf, "Learning from Labeled and Unlabeled Data Using Random Walks," *Lecture notes in computer science*, 2004, Springer, 8 pages.

Zhu et al., "Semi-Supervised Learning Using Gaussian Fields and Harmonic Functions," *Poc. 20th Intl Conf on Machine Learning*, 2003, 8 pages.

Zhu, "Semi-Supervised Learning with Graphs," 2005, Doctoral Thesis, Carnegie Mellon University, 174 pages.

Examiner Henriëtte Huysing-Solles, International Search Report/Written Opinion in PCT/US2008/062263 mailed Jan. 1, 2008, 13 pages.

Examiner Simin Baharlou, International Preliminary Report on Patentability in PCT/US2008/062263 mailed Nov. 12, 2009, 7 pages.

Examiner Lee W. Young, International Search Report/Written Opinion in PCT/US2008/62285 mailed Dec. 5, 2008, 12 pages.

Examiner Nora Lindner, International Preliminary Report on Patentability in PCT/US2008/62285 mailed Nov. 12, 2009, 8 pages.

\* cited by examiner

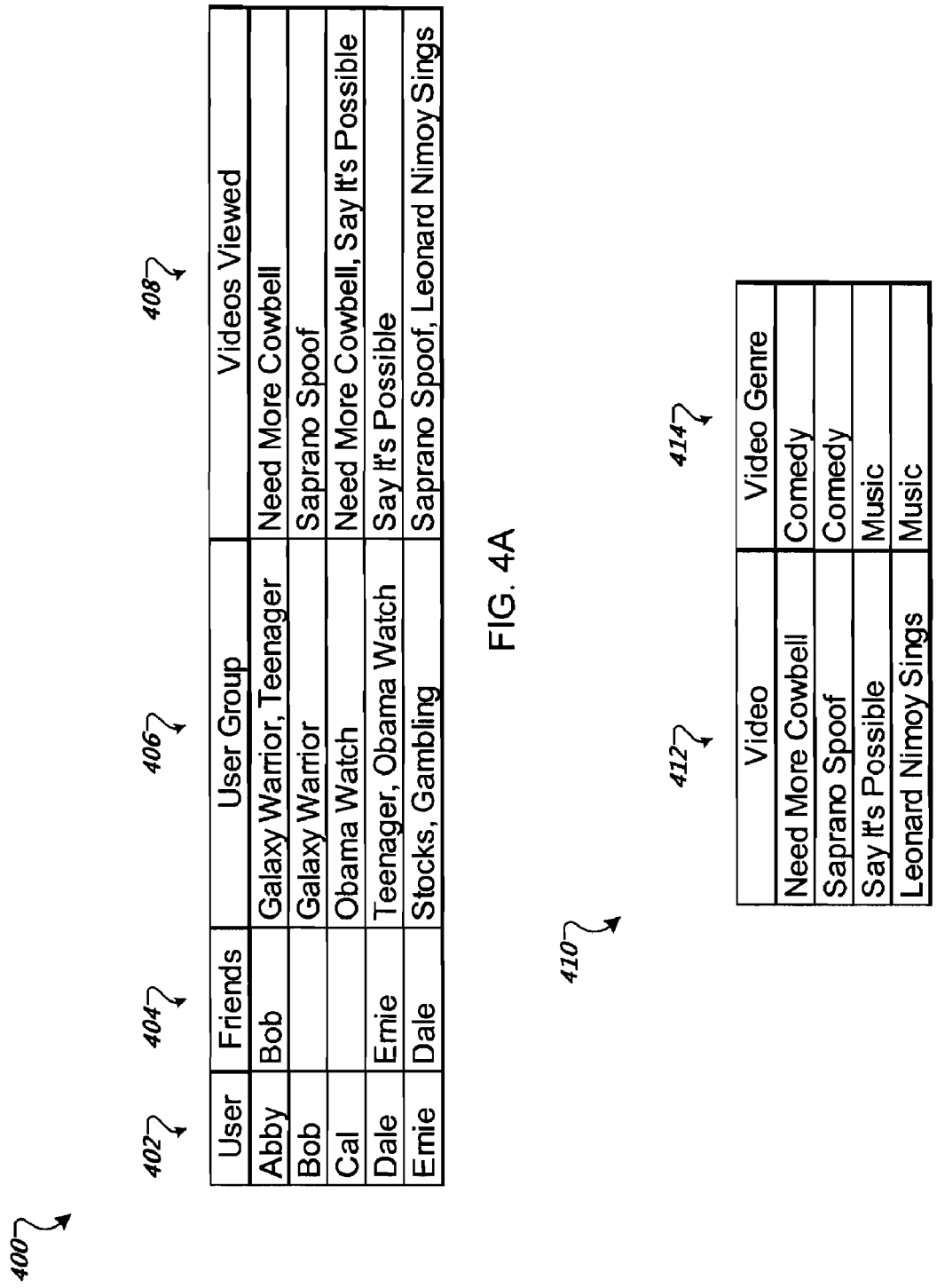

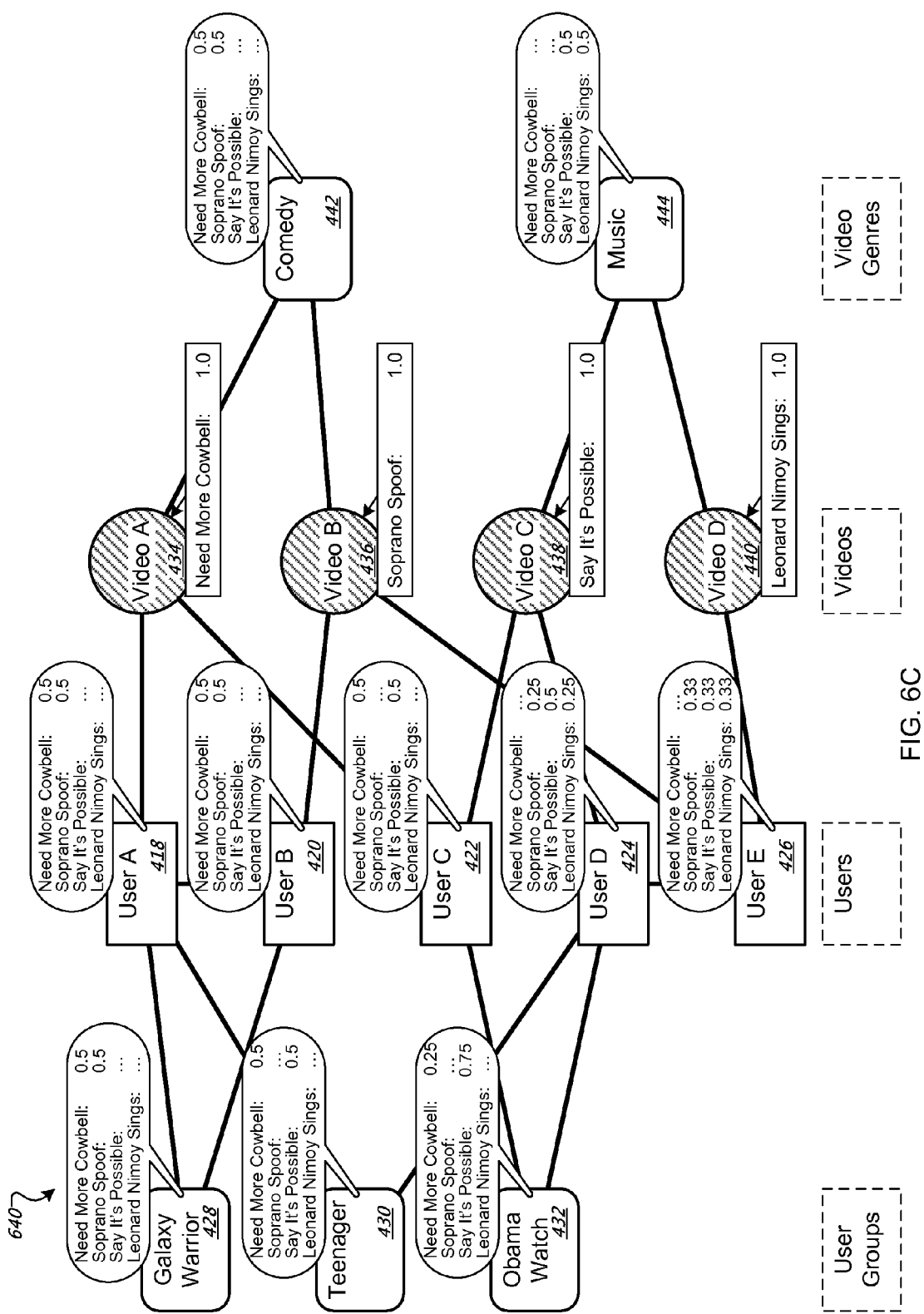

VIDEO-RELATED RECOMMENDATIONS USING LINK STRUCTURE

TECHNICAL FIELD

This instant specification relates to generating recommendations for videos and advertisements based on inferred labels derived from relationships between entities in a social network.

BACKGROUND

Social networks can permit users to post information about themselves and communicate with other people, such as their friends, family, and co-workers. Some social networks permit users to specify friendships with other users. Additionally, social network users may write descriptions of their interests, compose stories, describe their lives, etc. Some user may generate a great amount of content, while other users may generate very little.

Some social networks permit users to watch videos, post comments about the videos, communicate with other users watching the videos, and share the videos with their friends. For example, YOUTUBE is such a social network. Advertisers may wish to target the users of social networks by placing advertisements so that they are along side videos watched by social network users.

SUMMARY

In general, this document describes generating video-related recommendations based on relationships between users and videos.

In a first general aspect, a computer-implemented method is described. The method includes receiving user information associated with users of a social network and associated with media accessed by the users. The method also includes generating a data structure that links first representations of the users and second representations of the media based on relationships derived from the user information and selecting a type of representation from among the first and second representations as a label type to associate with unselected types of representations. Additionally, the method includes outputting a label value for the selected label type for a particular representation based on label values of the selected label type for neighboring representations that are linked to the particular representation In a second general aspect, a computer-implemented method is described, where the method includes receiving user information associated with users of a social network and associated with videos accessed by the users. The method includes generating a graph that links graph nodes based on relationships derived from the user information. The graph nodes include user nodes representing the users, ad nodes representing advertisements, and video nodes representing the videos. The method also includes selecting one or more of the user, ad, or video nodes as a label to associate with the graph nodes and outputting, for a first graph node, a first label value for the label associated with the particular graph node based on one or more second label values for the label that are associated with neighboring graph nodes that are linked to the particular graph node.

In another general aspect, a system is described. The system includes an interface to receive social network information associated with users of a social network and media accessed by the users, a data structure generator to generate representations of entities associated with the social network and to link the representations based on relationships derived from the social network information, and means for selecting a type of representation from among the representations as a label type to associate with unselected types of representations and for outputting a label value for the selected label type for a particular representation based on label values of the selected label type for neighboring representations that are linked to the particular representation.

The systems and techniques described here may provide one or more of the following advantages. First, information such as video or advertising preferences can associated with a user even if a system does not have any explicit information about the user's preferences. Second, recommendations for videos can be provided to users regardless of whether information is know about what types of videos the user watches. Third, recommendations for advertisements to display to users can be recommended regardless of whether information is known about what types of advertisements the user has previously selected. Fourth, recommendations for advertisements to display in association with a video can be provided regardless of whether information is know about particular content of the video.

The details of one or more embodiments are set forth in the accompanying drawings and the description below. Other features and advantages will be apparent from the description and drawings, and from the claims.

DESCRIPTION OF DRAWINGS

FIGS. 4A-4D show exemplary information used for labeling users, groups of users, videos, genres, and advertisements.

FIGS. 6A-6D show exemplary graphs of users and videos in a social network, where an algorithm is used to infer label values for the users.

Like reference symbols in the various drawings indicate like elements.

DETAILED DESCRIPTION

This document describes systems and techniques for inferring labels for videos, users, advertisements, groups of users, and other entities included in a social network system. The inferred labels can be used to generate recommendations. For example, if a user has an inferred label for a certain advertisement, the label indicates that the user may be interested in the product being advertised. In some implementations, the inferred labels include video labels for users and advertising labels for videos or users. Inferred labels can be advantageous when explicit information about these entities is not available. For example, a particular user may not have clicked on any online advertisements, so the user is not explicitly linked to any advertisements.

Figure 1:
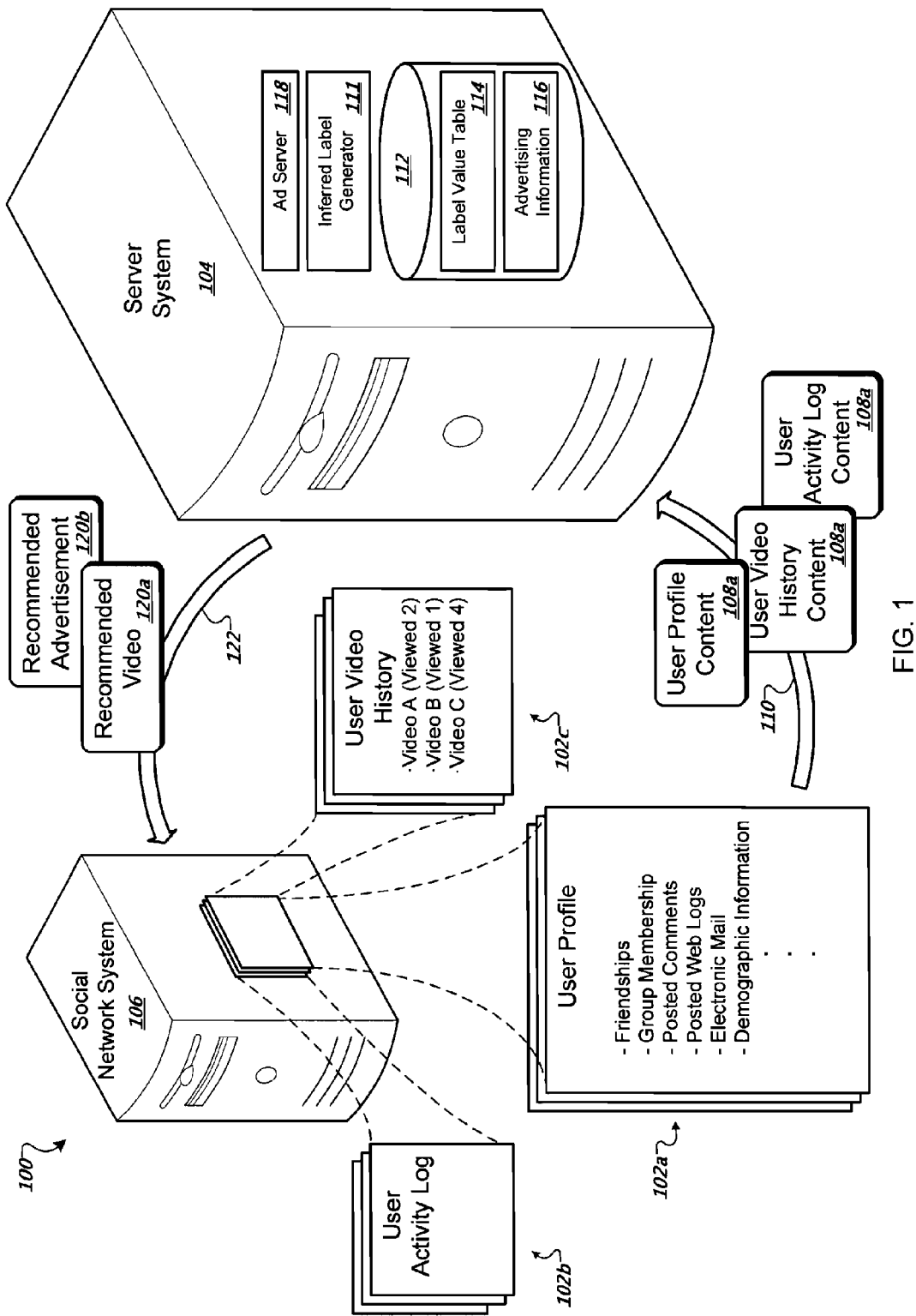
FIG. 1 is a schematic of an exemplary system for inferring labels for videos, users, advertisements, groups of users, and other entities included in a social network system.

In some implementations, inferred labels are inferred based on social or other relationships derived from, for example, profiles or activities of social network users. Social networks can host information about and generated by the social network's users. For example, FIG. 1 shows a system 100 where users can generate multiple user profiles 102a, multiple user activity logs 102b, and multiple user video histories 102c, which can include interests, stories, facts, descriptions about a user, a record of actions performed by a user, or videos watched by a user. Additionally, the users can specify social relationships with other users or membership in a group of users having a particular interest. For example, a user can specify that other users are "friends." Similarly, videos can be grouped or classified by the genre of the video. For example, a video can be classified as a comedy or a music related video.

In some implementations, the described systems and methods permit a user (or other entity associated with a social network) to be labeled with, for example, ads or videos of interest to the user without using information directly from the user. Instead, the labels can be inferred based on content or activities associated with a user's friends.

Advertising systems, such as a server system 104 of FIG. 1, can target online advertisements (ads) or videos to a user of a social network. In certain implementations, the advertising system generates the online ads and videos based on the content of the user profiles 102a, the user activity logs 102b, and the user video histories 102c. In some situations, a user may not provide enough (or any) information in his profile, log, and/or history, which may make it difficult to generate online ads or recommend videos that are accurately targeted to the user.

In the situation where a first user lacks information in his profile, log, and/or history, profiles, logs, and/or histories of other users that are related to the first user can be used to generate online ads and video recommendations for display to the first user. For example, a first user Isaac may not have any information in his profile except that he has two friends—Jacob and Esau. The server system 104 can use information from Jacob and Esau's profiles or activities to infer information about Isaac. For example, the inferred information can be used to generate online ads and recommended videos that are displayed to Isaac or to other users when they view Isaac's profile.

FIG. 1 is a schematic showing an example of the system 100 for inferring labels for videos, users, advertisements, groups of users, and other entities included in a social network system. In some implementations, the system 100 includes a social network system 106 and the server system 104 discussed previously, which can determine associations between users and other entities within a social network (e.g., hosted videos, advertisements, etc.) based on social relationships specified by the user profiles 102a and/or users activities (e.g., videos watched by users, comments posted by users, etc.).

In some implementations, the social network system 106 includes the user profiles 102a, which can include user generated content, such as user interests, user blogs, e-mail, postings by the user on her or other users' profiles (e.g., comments in a commentary section of a web page), a user's list of favorite hosted audio, images, and other files, and demographic information about the user, such as age, gender, address, etc.

Additionally, the user profiles 102a can include social relationships that specify associations between users of the social network system 106. For example, a user Joshua may list Aaron and Caleb as friends and may be a member of the Trumpet Player Society, which includes Izzy as a second member. The specified friendship and group membership relationships can be used to infer a similarity in user interests between the users Joshua, Aaron, Caleb, and Izzy.

The user activity logs 102b can include information about activities or actions a user has performed. For example, the user activity logs 102b can include a record of ads selected or clicked on by a user (alternatively, this can be stored elsewhere, such as at the server system 104). The user activity logs 102b can include statistics regarding correspondence (e.g., e-mails or instant messages) held between two users, such as a number of messages per day or length of messages. In another example, the user activity logs 102b include information about whether a user commented on another user's web page(s), a frequency that a user visited another user's web page, the amount of time a user spent at another user's web page, etc.

The user video histories 102c can include information about videos or other media presented to and/or accessed by a user. For example, the user video histories 102c can include an identifier of a video or other media that a user has watched or accessed. In some implementations, the identifier can include a title, filename, file size, meta data, storage location, or a content-based identifier (e.g., a check sum or cyclic redundancy check). The user video histories 102c also can include statistics related to the video or media, such as a time and date a video was viewed by a user or a number of times a user viewed the video.

Information, such as user profile content 108a, of the user profiles 102a can be transmitted to the server system 104. In addition, information such as user activity log content 108b and information such as user video history content 108c can be transmitted to the server system 104, as indicated by an arrow 110. The server system 104 can use an inferred label generator 111 to create labels for various entities included in the social network system 106 (e.g., users, videos, groups of users, and advertisements displayed to users). For example, incomplete or sparsely populated user profiles can be populated with video labels indicating videos in which owners/authors of the profiles may be interested. The inferred labels can be "inferred," or derived, from videos watched by related users (e.g., videos watched by friends of the user or videos watched by members of the same group, clubs, society, etc.).

In the implementation of FIG. 1, the server system 104 includes a data store 112, where information about the labels can be stored. In some implementations, each entity represented on the social network system may be associated with more than one label. For example, a user (or user profile) may be associated with more than one advertising label—user1 could be associated with a label for Nike's Ad1 and a label for Gatorade's Ad4, where each of the labels indicate that the user may be interested in the ads identified by the labels. The associations between each user or user profile and corresponding labels can be stored in a data structure, such as a label value table 114.

In some implementations, the label value table 114 can also include label values that indicate a possible interest level for each label. For example, social network user Adam may have watched videos about both gardening and animal husbandry, but the user video history for Adam indicates that he watched the gardening video twice as many times as he watched the animal husbandry video. In this case, the label value table 114 can include a label value of 0.66 for gardening video and 0.33 for animal husbandry video under Adam's user identifier.

The data store 112 can also store advertising information 116 used to select a recommended advertisement (ad) directed to a social network user or video hosted by the social network system 106. The server system 104 includes an ad server 118. The ad server 118 can transmit a recommended ad 120b for display with pages viewed by a social network user or in association with videos viewed by the user. The ad server 118 can use the label information in the label value table 114 to select the recommended ad 120b, which is targeted for either users or videos based on labels associated with the users or videos. The server system 104 can transmit, as indicated by arrow 122, the recommended ad 120b to the social network system 106 for display to users of the social network system 106.

Similarly, the server system 104 can select a recommended video 120a to display or recommend to users of the social network based on inferred video labels associated with a user. For example, if a user John is associated with two video labels—one a "Playstation 3 commercial" and another "I'm Hearing Voices!," the system may transmit a recommendation that John watch one or both videos. Alternatively, the system can initiate playing the video when John logs onto the social network system or otherwise accesses a page within the social network system 106.

In another implementation, the recommendation can be transmitted to the user even if the user is not viewing a page on the social network system. For example, the video recommendation can be displayed when the user logs onto a web based email system such as GMAIL provided by GOOGLE. In another example, the video recommendations (or the other recommendations or ads discussed previously) can be displayed when the user is presented with search results from a search engine. In yet another example, the recommendations or ads can be displayed when the user visits a third-party web page that displays ads such as implemented in GOOGLE's ADSENSE technology.

In some implementations, the user is identified for the recommendations or ads by the Ad server, search engine, email provider, etc., using an identifier, such as a cookie or other information appended or otherwise including with information used to request the viewed web page. For example, the social network system 106 can issue a cookie to the user, which is used to identify the user outside the social network.

Figure 2:
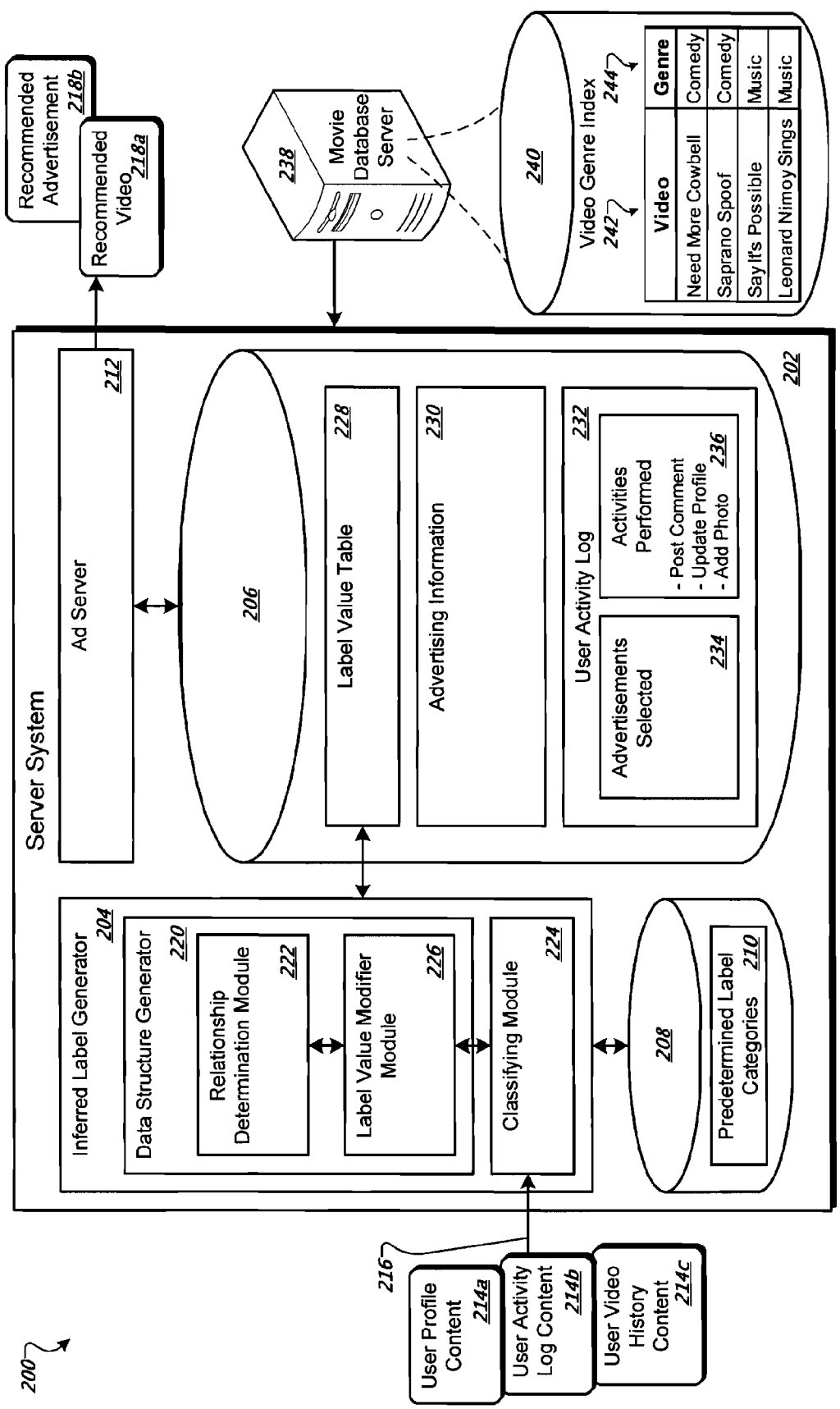
FIG. 2 is a box diagram of an exemplary system that shows a server system and infers labels for entities of a social network system.

FIG. 2 is a box diagram showing an example of a system 200 including a server system 202 that infers labels for entities associated with a social network system such as social network users, user groups, media accessed by the users, advertisements displayed to the users, etc. The server system 202 includes an inferred label generator 204, a first data store 206 that includes label values and ad information, a second data store 208 that includes one or more predetermined label categories 210, and an ad server 212.

In some implementations, the server system 202 can receive information such as user profile content 214a of user profiles from a social network system, user activity log content 214b, and user video history content 214c, as indicated by arrow 216. The server system can use the user profile content 214a, the user activity log content 214b, and/or the user video history content 214c to select or generate labels based on the content, where the labels can be used to generate a video recommendation 218a or a recommended ad 218b that is targeted to users or videos.

In some implementations, the inferred label generator 204 includes a data structure generator 220 to create a data structure used to infer the labels. For example, the data structure generator can generate a graph, where each user (or user profile) is represented with a node. The data structure generator 220 can include a relationship determination module 222 that links the nodes with edges based on social relationships specified by the user. For example, a user Adam may specify in his profile that Seth is a friend. The relationship determination module 222 can join the user nodes for Adam and Seth with an edge. The edges may be bi-directional or uni-directional, however for the purposes of clarity, the edges in the following examples, are bi-directional unless otherwise specified.

In other implementations, the generated graph includes nodes representing other entities associated with the social network system such as videos watch by the users, groups of users, and ads displayed to users. The nodes also can be joined by edges based on relationships. For example, a node representing a user can be linked to a node representing a video if the user watched the video. A node representing a video can be linked to a node representing an ad if a user selected the ad when presented with the video.

The inferred label generator 204 also includes a classifying module 224. The classifying module 224 can classify videos into video genres or categories. The classifying module 224 may use the predetermined label categories 210 to associate a genre with videos or other media presented to or viewed by a user. For example, the classifying module 224 may extract a title, words from the title, or other meta-data words associated with a video. The extracted words or identifiers may be associated with categories or genres in the predetermined label categories 210. The classifying module 224 can retrieve the associated genre from the predetermined label categories 210 using the extracted identifiers. The data structure generator 220 creates nodes in the graph for the retrieved genres if not already present in the graph. The data structure generator 220 also creates edges that link the genre nodes to their associated video nodes.

In some implementations, the data structure generator 220 also includes a label value modifier module 226. The label value modifier module 226 can modify label values associated with users (and label values associated with groups of users, advertisers, videos, and video genres) using methods and structures more fully described below.

Initial and modified label values can, in some implementations, be stored in a data structure, such as a label value table 228 of the first data store 206. The label value table 228 can include an index that associates label values with each of the following: users, groups of users, videos watched, and video genres.

The ad server 212 can use data such as advertising information 230 stored in the first data store 206 to generate or select, for example, an electronic advertisement that is based on the label or label values associated with each user. The server system 202 can also generate video recommendations that are based on the label or label values associate with each user. For simplicity of explanation, the ad server 212 is described as generating or selecting the video recommendations, although another element of the server system 202 can perform this function.

The advertising information 230 can include, for example, information about the advertisers, such as an advertiser identifier, payment information, bidding price for ads, etc. The advertising information 230 can also include advertisements (ads), one or more of which are selected for display to a user based on the inferred labels and/or contextual information (e.g., subject matter) gathered about a web page a user is viewing.

The server system 202 can store the user activity log content 214b in the first data store 206 as a user activity log 232. The user activity log 232 includes information such as advertisements selected 234 by the social network user. The user activity log 232 also can include information such as activities performed 236 by the social network user. For example, the advertisements selected 234 can include a list of ad identifiers for ads selected by a particular user as well as the time and date the ad was selected or meta data associated with the ad (e.g., a advertiser company name or a type of product or service advertised in the selected ad).

The activities performed 236 also can include activities that indicate how active a user is on the social network system (e.g., whether the user posts comments and on which pages the comments are posted, whether the user regularly updates his or her profile page, whether the user has added a photo to his or her profile page, etc.).

The server system 202 can incorporate the user activity log 232 information into the label value table 228 and/or the graph produced by the data structure generator 220. In some implementations, the relationship determination module weights an edge connecting two users based on how frequently the users interact. For example, if Josh visits Rachelle's page everyday and Deb only visits Rachelle's page every other day, then the edge representing Josh's friendship with Rachelle may be weighted twice as much as the edge representing Deb's friendship with Rachel. As a result, in some implementations, any labels that Rachelle inherits from Josh contribute twice as much as any labels inherited from Deb.

Activity frequency (e.g., downloads, ad clicks, comments, e-mails, blog posts, or other communication) between other types of nodes, such as a user group or video nodes, can be used to rate relationship edges as well. For example, Josh downloaded a "Need More Cowbell" video three times as much as Deb, therefore a weight for Josh's edge to the "Need More Cowbell" video is three times larger than the weight of Deb's edge to the "Need More Cowbell" video. Alternatively or in addition, activity between nodes may be used to create links between the nodes. For example, the data structure generator 220 can create an edge between Rachelle and a "Soprano Spoof" video based on a comment Rachelle made on a "Soprano Spoof" video viewing page.

The data structure generator 220 can also create an edge between Josh and Deb based on an e-mail sent by Josh to Deb. In another example, the data structure generator 220 can create nodes in the graph for the advertisements selected 234 by the social network users.

The data structure generator 220 can add additional information to the predetermined label categories 210 and/or the label value table 228 based on information from a movie database server 238. In some implementations, the movie database server 238 stores information about media that can be presented to the social network users. For example, the movie database server 238 can include descriptions and classifications of videos (e.g., "Need More Cowbell" may be classified as a "Comedy"). In some implementations, the movie database server 238 includes a video genre index 240. The video genre index 240 includes one or more video identifiers 242, such as video titles, file names, or other identifiers. The video genre index 240 associates one or more genres 244 with each of the video identifiers 242. The genres 244 classify the content of the videos, such as in a comedy genre or a music genre.

The data structure generator 220 generates nodes in the graph for each of the video genres. The relationship determination module 222 creates edges between video nodes and the genre nodes to which the videos belong, as determined by the video genre index 240 or the predetermined label categories 210.

Also, in other implementations, expert raters can provide the genre information directly to the server system 202 for use in the predetermined label categories 210 and/or the label value table 228. For example, an expert rater may watch and review a video to assign a predetermined genre category to the video.

As discussed above, the data structure generator 220 can generate nodes in the graph for media or videos viewed by a user. The relationship determination module 222 can assign edges between nodes representing users and nodes representing the media or videos presented to or selected for viewing by the users. The data structure generator 220 also can generate nodes in the graph for genres received from the movie database server 238. The relationship determination module 222 assigns edges between nodes in the graph, for example, nodes that represent media or videos and nodes representing the genre associated with the media or videos.

Figure 3:
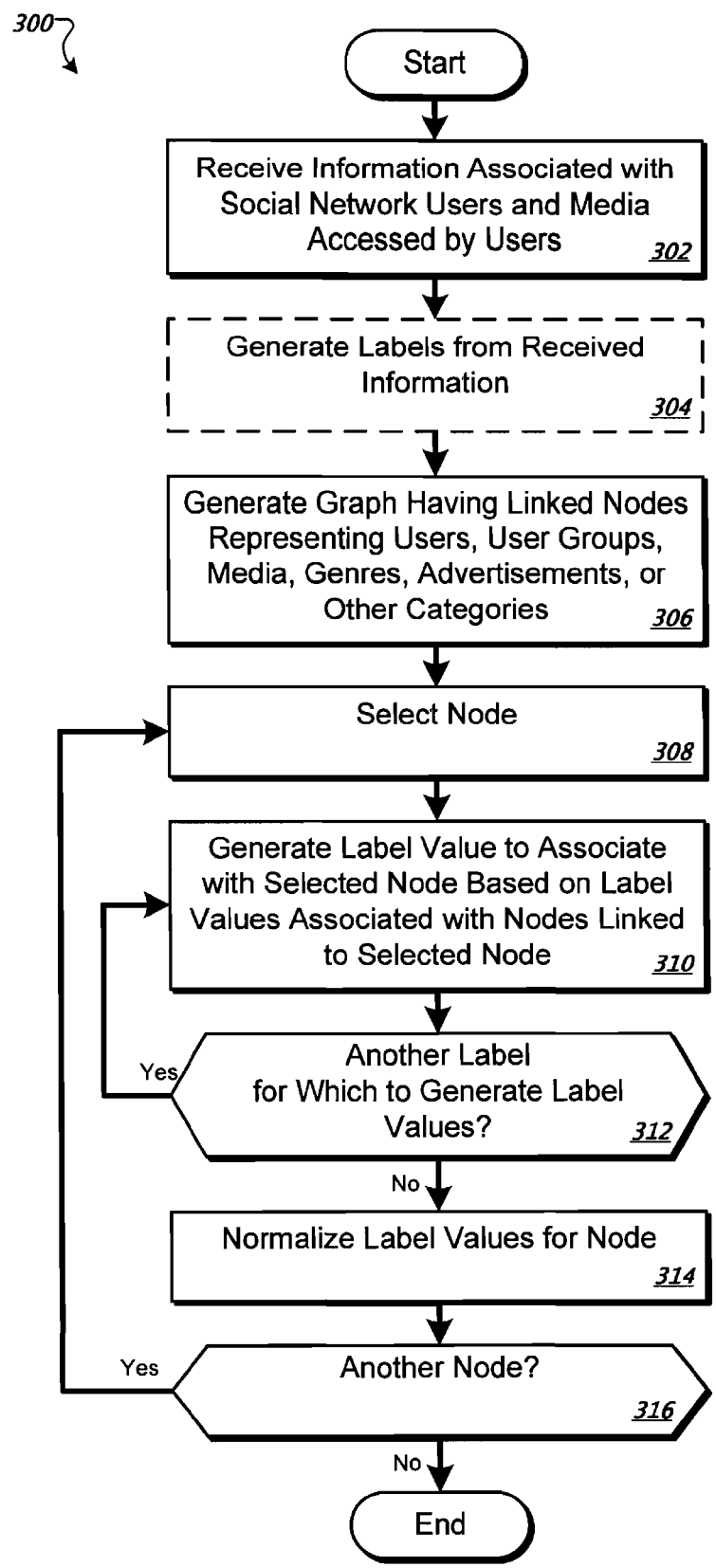
FIG. 3 is an exemplary method for generating inferred labels used to make advertisement or video-related recommendations.

FIG. 3 is an example of a method 300 for generating inferred labels. In one implementation, the method 300 includes steps that can be implemented as instructions and executed by a processor in the server system 202.

The method 300 can begin with step 302, where information associated with social network users and information associated with media accessed by users are received. For example, the inferred label generator 204 receives the user profile content 214a, the user activity log content 214b, and the user video history content 214c from a system such as the social network system 106. In addition, the inferred label generator 204 can receive or access the video genre index 240 from the movie database server 238 to retrieve genre data related to videos.

The user profile content 214a can include relationships to other users. Relationships to other users may be explicit as in a list of friends or possibly a rating of an importance of the friend (e.g., bff (best friend forever), close friend, acquaintance). Relationships to other users may be implicit as well. For example, a friendship may be derived based on activity with another user, such as visits to another user's profile page or electronic communication sent to another user.

The user profile content 214a can include information about membership in groups. Memberships may be explicit or implicit. For example, a user's profile may explicitly include a list of groups or organizations to which the user belongs (e.g., Future Farmers of America (FFA) club or an e-mail list for the microsoft.public.visio.developer.vba discussion group). The groups may be implicit as well. For example, a user's profile may include demographic information from which group membership may be derived. Josh's profile may indicate that Josh is between 13 and 19 years old. Based on Josh's profile, the relationship determination module 222 can create an edge between Josh's user node and the "Teenager" user group.

In another example, a user may input a selection of node and/or edge information to the inferred label generator 204. For example, a user may input a list of user groups to be used, such as "Galaxy Warrior," "Teenager," and "Obama Watch," or genres to be used, such as "comedy," and "music."

In optional step 304, labels can be generated from the information received in step 302. For example, the classifying module 224 can classify a video as belonging to a particular genre. The classifying module 224 may use video/genre information from the predetermined label categories 210 or the video genre index 240. In addition, the relationship determination module 222 can create friendship edges and edge weights between users based on activity between the users, as previously described. The relationship determination module 222 also can create edges between users and groups based on demographics in the user profiles. For example, if the phrase "Galaxy Warrior" occurs frequently in a user profile for Josh, then the relationship determination module 222 can create an edge between a user node representing Josh and a group node representing "Galaxy Warrior."

In addition, the data structure generator 220 can create nodes based on content in the user profiles. For example, if a phrase occurs in multiple user profiles, such as "Flying Spaghetti Monster," the data structure generator 220 can create a group node representing the phrase. The relationship determination module 222 can create edges between the "Flying Spaghetti Monster" group node and the user nodes whose profiles include the phrase.

In step 306, a data structure, such as a graph, is generated. The graph can have nodes representing users, user groups, media, media genres, advertisements, or other categories or entities. The graph can have edges representing relationship links between nodes. For example, user nodes can have edges representing friend relationships, users and user groups can have edges representing member relationships, users and media can have edges representing whether the media was accessed by the users, media and genres can have edges representing classification relationships, and user or video nodes can have edges to advertisements representing ad placement relationships.

For example, the data structure generator 220 can represent each user, user group, advertisements, videos, and video genres as a node in the graph. The relationship determination module 222 can link the nodes based on social and other relationships derived, for example, from information received in step 302. For example, the relationship determination module 222 can link two user nodes together if the users specified each other as "friends" on their user profiles. In another example, an advertisement node can be linked to a video, where the advertisement is included in the video or has been selected by a user who viewed the video.

In some implementations, nodes are "injected" with label values that do not change based on label values assigned to neighboring nodes. For example, a video node may represent a video showing the adventures of the Teenage Mutant Ninja Turtles (TMNT). The node may have an injection label value of 1.0 for TMNT. This label value can remain static throughout the application of algorithm(s) that are used to infer label values based on label values of neighbor nodes. These algorithms are discussed in greater detail below.

Additionally, in some implementations, the inferred label generator 204 generates a second data structure, such as a second graph. The second graph can also include nodes substantially similar to the first graph. In certain implementations, different algorithms to infer labels can be run on the two graphs and the results can be compared to refine the accuracy of the labels. This is also described in more detail below.

In step 308, a node is selected. For example, the inferred label generator 204 can select a user node representing a user in a graph, a user group node, a video node, a video genre node, or an advertisement node. The inferred label generator 204 can access neighboring nodes that are linked to the selected node (e.g., the user's friends or videos watched by the user) and use their label values to generate a new or modified label value for the selected node, as indicated in step 310.

If the selected node has additional labels that have not been assigned new or modified label values, the inferred label generator selects the additional label and repeats step 310 until all the labels are processed, as indicated by step 312.

In step 314, the label values for the node are normalized. For example, the inferred label generator 204 can normalize the label values to a figure between a 0 and 1, where the figure expresses the label value's contribution relative to the other label values' contributions. For example, if the pre-normalized label values are Galaxy Warrior=2.0, Teenager=1.0, and Obama Watch=1.0, then the normalized values would be Galaxy Warrior=0.5, Teenager=.0.25, and Obama Watch=0.25.

If there is an additional node that has not been selected using the method 300, a next unselected node can be selected as illustrated by step 316. For example, the inferred label generator 204 can select the next unselected node. If all the nodes have been selected, the method 300 can end.

In some implementations, steps 308-316 can also be performed on the second graph described in association with step 306. The inferred label generator 204 can select and compare the resulting label value magnitudes for a corresponding node from both the first and second graphs. In some implementations, the inferred label generator 204 can combine the label value magnitudes from each graph through linear weighting to determine a final label value magnitude (e.g., the first graph's label value contributes 0.7 and the second graph's label value contributes 0.3). In other implementations, the values can be weighed equally to determine the final label value (e.g., 0.5, 0.5) for a particular node, or the inferred label generator 204 can give one value its full contribution while ignoring the value from the other graph (e.g., [1.0, 0.0] or [0.0, 1.0]).

In other implementations, the inferred label generator can use a cross-validation method to set the contribution weights for label value magnitudes from each graph. For example, the inferred label generator 204 can access nodes in a graph, where the nodes have label value magnitudes that are known. The inferred label generator 204 can compare the actual label value magnitudes with the known label value magnitudes. The inferred label generator 204 can then weight each graph based on how closely its values match the known label values.

In certain implementations, the label generator 204 can compare the label value magnitudes to an expected a priori distribution, instead of or in addition to examining the final label magnitudes. For example, if a summed weight of label_A across all nodes is 8.0 and the weight of label_B across all of the nodes is 4.0, the a priori distribution suggests that label_A may be twice as likely to occur as label_B. The inferred label generator 204 can use this expectation to calibrate the label value magnitudes for each user node. If in node_n, Label_A weight is 1.5 and label_B weight is 1.0, then the evidence for label_A, although higher than label_B, is not as high as expected because the ratio is not as high as the a prior distribution. This decreases the confidence that the difference in magnitudes is meaningful. A confidence factor can be translated back into the rankings.

In some implementations, if the difference in magnitudes is below a confidence threshold, the inferred label generator 204 can rank a label with a lower weight above a label with a higher weight (e.g., manipulate the lower weight so that it is increased to a value greater than the higher weight). For example, if label_A's weight is expected to be three times the weight of label_B, but was only 1.1 times greater than label_B, the inferred label generator 204 can rank label_B above label_A. In some implementations, the confidence factor can be kept as a confidence measure, which can be used, for example, by machine learning algorithms to weight the resultant label value magnitudes.

In yet other implementations, instead of or in addition to comparing the label value magnitudes based on the a priori distribution of the nodes, the inferred label generator 204 can compare the label value magnitudes based on an end distribution of magnitudes across all nodes. For example, the inferred label generator 204 can measure how different a particular node's distribution is from an average calculated across all nodes in a graph.

Given the labels generated by the inferred label generator 204, in some implementations, the ad server 212 can use the labels to recommend ads to display. For example, a user Josh has a node with an edge connecting to a "Britney Spears" group node. Users represented by other nodes may be linked to the "Britney Spears" group node as well. The other users selected a particular music ad, which results in the inferred label generator labeling Josh with the particular music ad because he is related to the other users via the "Britney Spears" group node. The ad server 212 can recommend the music ad for display to Josh based on the label for the music ad that was applied to Josh.

In some implementations, other factors can influence whether an ad is displayed based on the labels. For example, the ad server 212 can factor in how much an advertiser is willing to pay for display of the ad, such as the cost per impression/click/transaction/etc., to determine whether to display an advertisement and which advertisement to display.

FIGS. 4A and 4B show exemplary information used for labeling users, groups of users, videos, ads, and video genres. A table 400 shown in FIG. 4A includes an example of information about users of a social network. The table 400 has four columns, which include multiple user identifiers 402, multiple friend identifiers 404 that specify users' friends, multiple user group identifiers 406 generated based on content from users' profile pages, and multiple video identifiers 408 that specify with which videos or other media with which the users have been presented.

In some implementations, information used for labeling users, user groups, videos, and genres may also include advertisement information. For example, the user information in the table 400 can include identifiers of ads presented to or selected by each of the users. In addition, the information may indicate a number of times that the ads were presented or selected as well as other information such as the date and time the ad was presented or selected. Similarly, tables of information for user groups, videos, and video genres can include information about associated ads.

FIG. 4B shows a table 410 that includes multiple video identifiers 412 and video genre identifiers 414 in the social network system according to one implementation. For example, content from the user's profile page on the social network or the user's video history content can be used to determine the video identifiers. In certain implementations, the genre identifies 414 are generated and stored in the table by the classifying module 224 based on retrieved genre information from the video genre index 240.

Although not shown, the table 410 also can include advertisement information. For example, the table 410 can include identifiers or other data related to ads presented with a video. For example, a "Need More Cowbell" video entry in the table 410 can include data specifying an ad for a comedy cable television channel. The data may include additional information such as a number of times the ad was presented with the video, a number of times the ad was selected when presented, and dates and times that the ad was presented or selected.

Figure 4C:
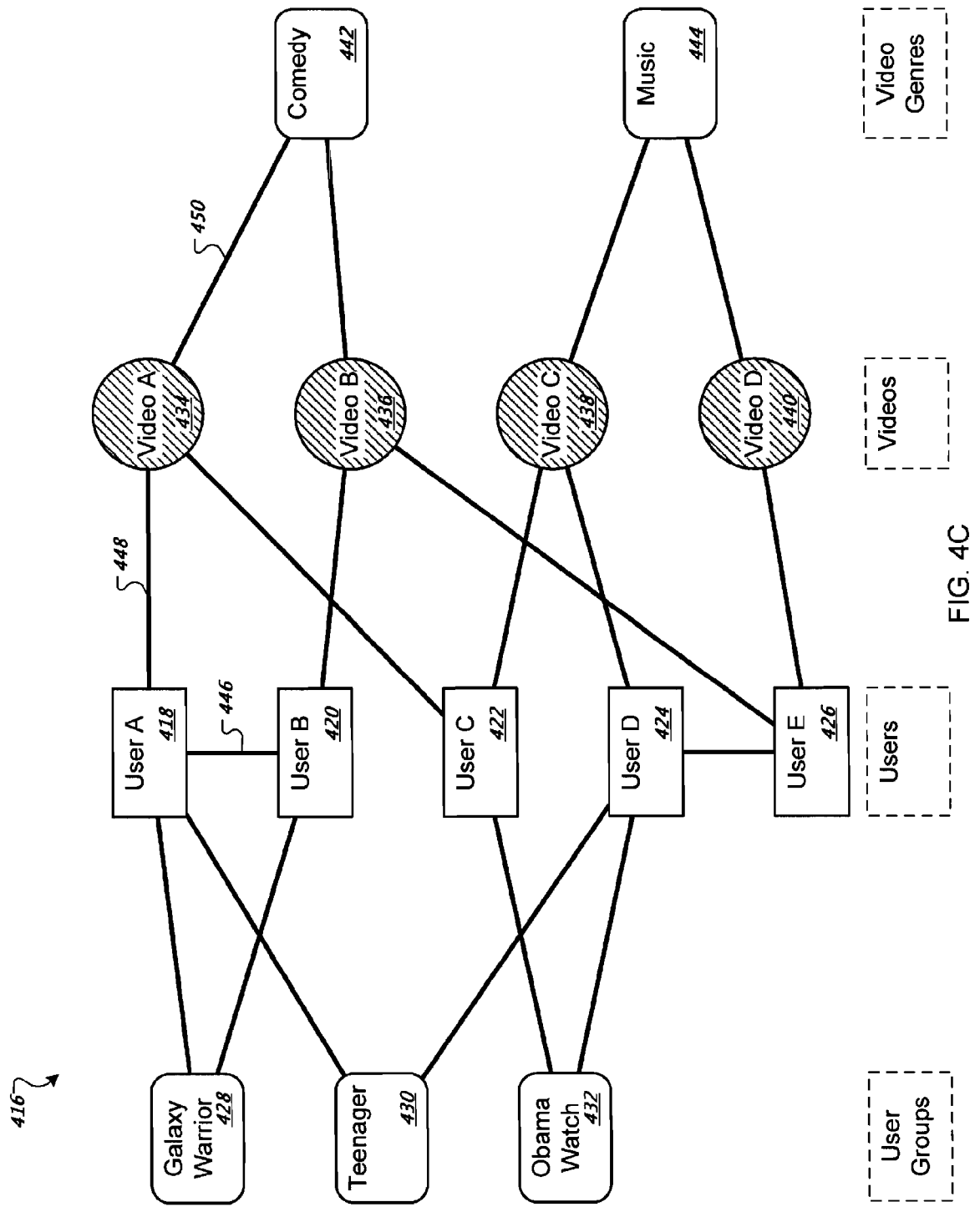

This information can also be represented by a data structure such as a graph. FIG. 4C shows an example of a graph 416 for representing users, user groups, videos, and video genres. Each of the users in a social network can be represented as nodes in the graph. For example, Abby, Bob, Cal, Dale, and Ernie, each are represented by multiple user nodes 418, 420, 422, 424, and 426, respectively. The graph 416 shows multiple user group nodes 428, 430, and 432 that represent user groups, such as Galaxy Warrior, Teenager, and Obama Watch. The graph 416 includes multiple video nodes 434, 436, 438, and 440 representing the videos "Need More Cowbell," "Soprano Spoof," "Say It's Possible," and "Leonard Nimoy Sings," respectively. The graph 416 also shows multiple genre nodes 442 and 444 representing genres of the videos including "Comedy" and "Music," respectively. Labels associated with the videos, video genres, and/or user groups can be associated with the members of the groups. This is described in more detail below.

In certain implementations, the user nodes are linked by edges based on social relationships specified by the users. For example, the user node 418 representing Abby is linked by an edge 446 to the user node 420 representing Bob because Abby specified that Bob was a friend on her profile page.

The graph 416 can also include labels that associate user nodes with a probable interest (e.g., video interests, ad interests, group membership interests) of the user. In some implementations, the labels can be selected from a type of nodes. For example, video nodes can be selected to label the other nodes in the graph. In this way, the user nodes, the group nodes, and the genre nodes will be "labeled" with a video node. In certain implementations, if video nodes are selected to label the other nodes, the label values associated video nodes do not change, but are static. However, the label values for other nodes in the graph can change in response to algorithms used to infer the label values for the nodes in the graph. This is discussed more in association with FIGS. 6A-6D.

Edges of the graph 416 may be undirected, unidirectional, or bidirectional. For example, the table 400 of FIG. 4A shows that Abby lists Bob as a friend, but Bob does not list Abby as a friend. In this case the edge 446 in the graph 416 representing the friendship may be a unidirectional edge, as Bob does not list Abby as a friend.

In certain implementations, the labels have label values that express how much each label should contribute to the user node. For example, Abby may have a label "Need More Cowbell." The label "Need More Cowbell" can specify that Abby has watched a video entitled "Need More Cowbell" based on Abby's Video History information. The label value for "Need More Cowbell" can be increased if Abby is a member of a user group which is also associated with the label "Need More Cowbell."

In this example, the label value for "Need More Cowbell" may be twice the value for different label inherited from another user group because Abby is associated with the "Need More Cowbell" label through two means (e.g., user group membership as well as having watched the video), whereas she may only be associated with the different label through one source (e.g., her other group membership).

The graph 416 includes edges between video nodes and video genre nodes. Edges between video and video genre nodes indicate genres to which the videos belong, as determined by, for example, the video genre index 240. In particular, the graph 416 includes an edge 450 between the video node 434 and the genre node 442. The edge 450 indicates that "Need More Cowbell" belongs to or is classified as a "Comedy" video.

In some implementations, the inferred label generator 204 propagates labels from one node in the graph 416 to another node to generate the video recommendations for the users. Certain nodes and/or labels may be static. That is, labels do not propagate to the static node/label. For example, the video nodes may have static video labels. The static video labels are propagated from the video nodes to the other nodes. For example, the inferred label generator 204 may assign labels to each of the video nodes based on the name or identifier of the video (e.g., "Need More Cowbell," "Soprano Spoof," "Say It's Possible," and "Leonard Nimoy Sings"). The inferred label generator 204 propagates corresponding labels to users that watched the video. For example, the inferred label generator 204 propagates the "Need More Cowbell" label to Abby because she watched the video as indicated by an edge 448 connecting the user node 418 for Abby to the video node 434 representing the "Need More Cowbell" video. In addition, the inferred label generator 204 propagates the "Need More Cowbell" label to Bob as the user node 420 has the edge 446 that connects Bob's user node 420 to Abby's user node 418. The Ad Server 212 or other recommendation server (not shown) may subsequently recommend the "Need More Cowbell" video to Bob.

Figure 4D:
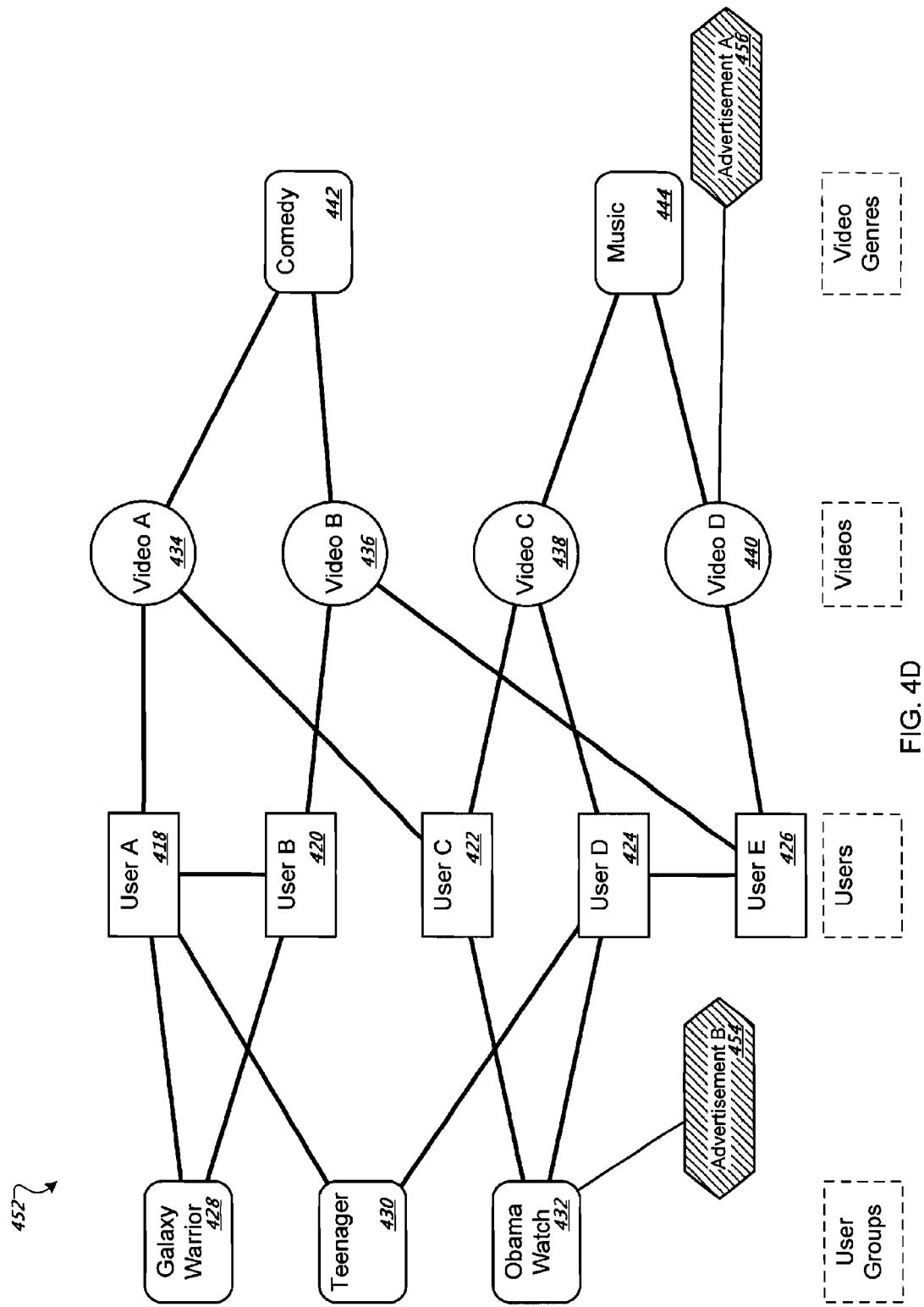

FIG. 4D shows another example of a graph 452 for the information illustrated in FIGS. 4A and 4B. Here, the graph 452 includes nodes that represent advertisements. For example, an edge, or link, connects the user group node 432 to an ad node 454. The ad node 454 represents a political party advertisement. The video node 440 has an edge connecting to an ad node 456. The ad node 456 represents an advertisement for a science fiction (sci-fi) convention.

The edges between the nodes are included in the graph based on the fact that the advertisements represented by the ad nodes 454 and 456 are presented in association with the "Obama Watch" user group and the "Leonard Nimoy Sings" video, respectively. For example, the political party ad may be presented on profile pages of users that are members of the "Obama Watch" user group. The sci-fi convention ad may be presented in association with or within the "Leonard Nimoy Sings" video. Each node can be associated with a label as previously described. Each label may include a label value that can be modified based on label values of neighboring nodes. In the graph 452, the ad nodes 454 and 456 have static label values because the ad nodes 454 and 456 are injection nodes that are being used to label the other nodes. The other nodes have variable label values. The inferred label generator 204 propagates labels and label values from the ad nodes 454 and 456 to the other nodes in the graph 452. In some implementations, injection nodes can be associated with more than one label. For example, the ad node 454 may have multiple labels, such as a name of advertiser associated with the ad and a name of a product or service presented in the ad.

Figure 5:
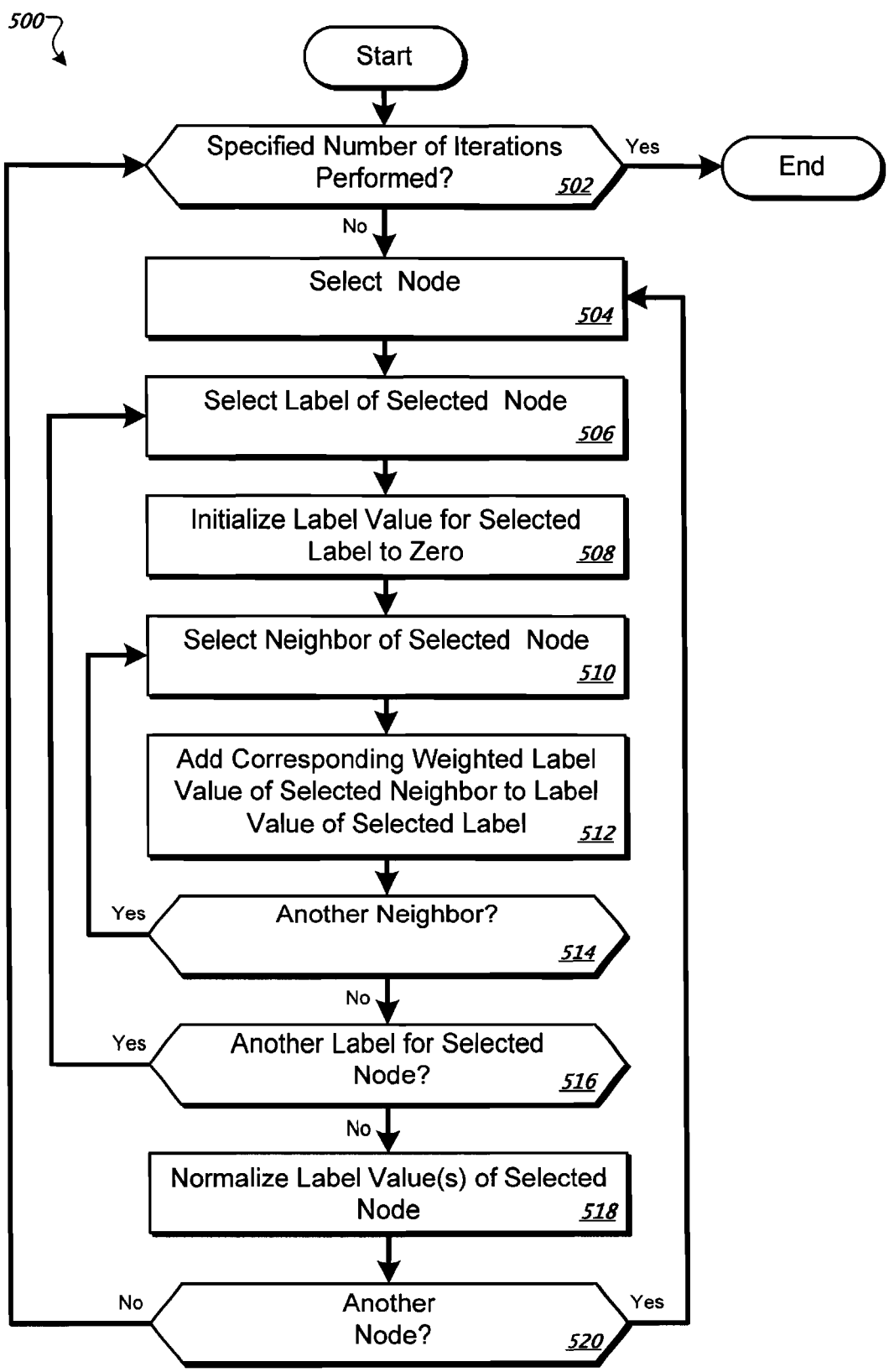
FIG. 5 shows an exemplary method for inferring labels based on a neighboring node's labels.

FIG. 5 shows an exemplary method 500, referred to here as an "adsorption" algorithm, for inferring labels based on neighboring nodes' labels. In some implementations, the inferred label generator 111 or 220 can include instructions that are executed by a processor of the server system 104.

The "adsorption" algorithm 500 can be executed using information from the graphs shown in FIGS. 4C and 4D and can be executed for every node in the graphs. The "adsorption" algorithm 500 can start with step 502, which determines if a specified number of iterations have run for a graph. If the number is not complete, step 504 is performed. In step 504, a node is selected. For example, the inferred label generator 204 can select a node that has label values that may be modified by the algorithm, such as user nodes, variable nodes, group nodes, etc.

In step 506, a label is selected from the selected node. For example, the inferred label generator 204 can select the label "Need More Cowbell" if present in the selected node. In step 508, a label value for the selected label is initialized to zero.

For example, the inferred label generator 204 can set the label value for "Need More Cowbell" to zero.

In step 510, a neighboring node of the selected node can be selected. For example, the selected node may specify that Abby is a friend. The inferred label generator 204 can select a neighboring user node representing Abby.

In step 512, a corresponding weighted label value of a selected neighbor is added to a label value of the selected label. For example, if Abby has a label value for the label "Need More Cowbell," the inferred label generator 204 can add this value to the selected node's label value for "Need More Cowbell." In certain implementations, the label value retrieved from a neighboring node can be weighted to affect the contribution of the label value based on the degree of distance from the selected node (e.g., based on whether the neighboring node is linked directly to the selected node, linked by two edges to the selected node, etc.) In some implementations, the label value can also be based on a weight associated with the edge. For example, the edge weight can reflect an explicit association between two nodes. For instance, a first node may specify that the associated user likes a friend Jack (where the value associated with liking Jack is 0.8), that the user likes friend Jill half as much as Jack, etc.

In other implementations, the contribution can be weighted based on whether a link to a neighboring node is bidirectional (e.g., the neighboring node also specifies the selected node as a friend). In another implementation, a weight may be based on the length of time that the relationship has existed. For example, if two users have listed each other as friends for a long period of time, the weight associated with the link between the two users may be higher than the weight for a link between two users that recently added each other as friends.

In another implementation, if a user has a high seniority, links from the user may have a higher weight than links emanating from a new member of the social network system. In some implementations, a user may input weights. For example, a user may rate friendships, community groups, or videos. The ratings may be used to weight the relationships.

In step 514, it is determined whether there is another neighbor node to select. For example, the inferred label generator 204 can determine if the selected node is linked by a single edge to any additional neighbors that have not been selected. In another example, a user may specify how many degrees out (e.g., linked by two edges, three edges, etc.) the inferred label generator should search for neighbors. If there is another neighbor that has not been selected, steps 510 and 512 can be repeated, as indicated by step 514. If there is not another neighbor, step 516 can be performed.

In step 516, it is determined whether there is another label in the selected node. For example, the selected node can have multiple labels, such as "Leonard Nimoy Sings," "Say It's Possible," as well as the "Need More Cowbell" label. If these additional labels have not been selected, the inferred label generator 204 can select one of the previously unselected labels and repeat steps 506-514. If all the labels in the node have been selected, the label values of the selected node can be normalized, as shown in step 518. For example, the inferred label generator 204 can normalize each label value so that it has a value between 0 and 1, where the label value's magnitude is proportional to its contribution relative to all the label values associated with that node.

In step 520, it can be determined whether there are additional nodes in the graph to select. If there are additional nodes, the method can return to step 504. If all the nodes in the graph have been selected, the method can return to step 502 to determine whether the specified number of iterations has been performed on the graph. If so, the "adsorption" algorithm 500 can end.

In certain implementations, the "adsorption" algorithm 500 can include the following pseudo code:

```
Set t = 0
For each node to be labeled, n, in the graph, G:
    For each label, l:
        Initialize the label: n_{l,t} = 0.0;
For t = 1..X iterations:
    For each injection node used to label other nodes, n, in the graph, G:
        For each label, l:
            Initialize the label amount: n_{l,t+1} = n_{l,t}
    For each non-injection node to be labeled, n, in the graph, G:
        For each label, l:
            Initialize the label amount: n_{l,t+1} = 0.0;
    For each node, n, in the graph, G:
        For each node, m, that has an edge with weight w_{mn}, to n:
            For each label:
                n_{l,t+1} = n_{l,t+1} + (w_{mn} * m_{l,t})
        Normalize the weight of the labels at each n, so that the sum of the
        labels at each node = 1.0
```

In certain implementations, after "X" iterations (e.g., 1000 iterations), the inferred label generator can examine one or more of the nodes of the graph and probabilistically assign a label to each node based on the weights of the labels (e.g., a label with the maximum label value can be assigned to the node).

In some implementations, the number of the iterations is specified in advance. In other implementations, the algorithm terminates when the label values for the labels at each node reach a steady state (e.g., a state where the difference in the label value change between iterations is smaller than a specified epsilon).

In another alternative method, label values for nodes can be inferred by executing a random walk algorithm on the graphs. More specifically, in some implementations, given a graph, G, the inferred label generator 204 can calculate label values, or label weights, for every node by starting a random walk from each node. The random walk algorithm can include reversing the direction of each edge in the graph if the edge is directed. If the edge is bi-directional, the edge can be left unchanged.

The inferred label generator 204 can select a node of interest and start a random walk from that node to linked nodes. At each node where there are multiple-out nodes (e.g., nodes with links to multiple other nodes), the inferred label generator can randomly select an edge to follow. If the edges are weighted, the inferred label generator can select an edge based on the edge's weight (e.g., the greatest weighted edge can be selected first).

If during the random walk, a node is selected that is a labeling node (e.g., used as a label for other nodes), the classification for this walk is the label associated with the labeling node. The inferred label generator can maintain a tally of the labels associated with each classification.

If during the random walk, a node is selected that is not a labeling node, the inferred label generator selects the next random path, or edge, to follow.

The inferred label generator can repeat the random walk multiple times (e.g., 1000s to 100,000s of times) for each node of interest. After completion, the inferred label generator can derive the label values based on the tally of labels. This process can be repeated for each node of interest.

Additionally, in some implementations, the inferred label generator 111 generates a second data structure, such as a second graph. The second graph can include nodes substantially similar to the graphs 416 and 452.

In some implementations, the adsorption algorithm 500 can also be performed on the second graph. The inferred label generator 111 can select and compare the resulting label value magnitudes for a corresponding node from both the first and second graphs as described in reference to FIG. 3.

FIGS. 6A-6D show exemplary graphs of users in a social network, where an algorithm is used to infer label values for the users. In some implementations, the algorithm may include some or all of the steps of the adsorption algorithm 500, the above pseudo code, or the described random walk algorithm.

Figure 6A:
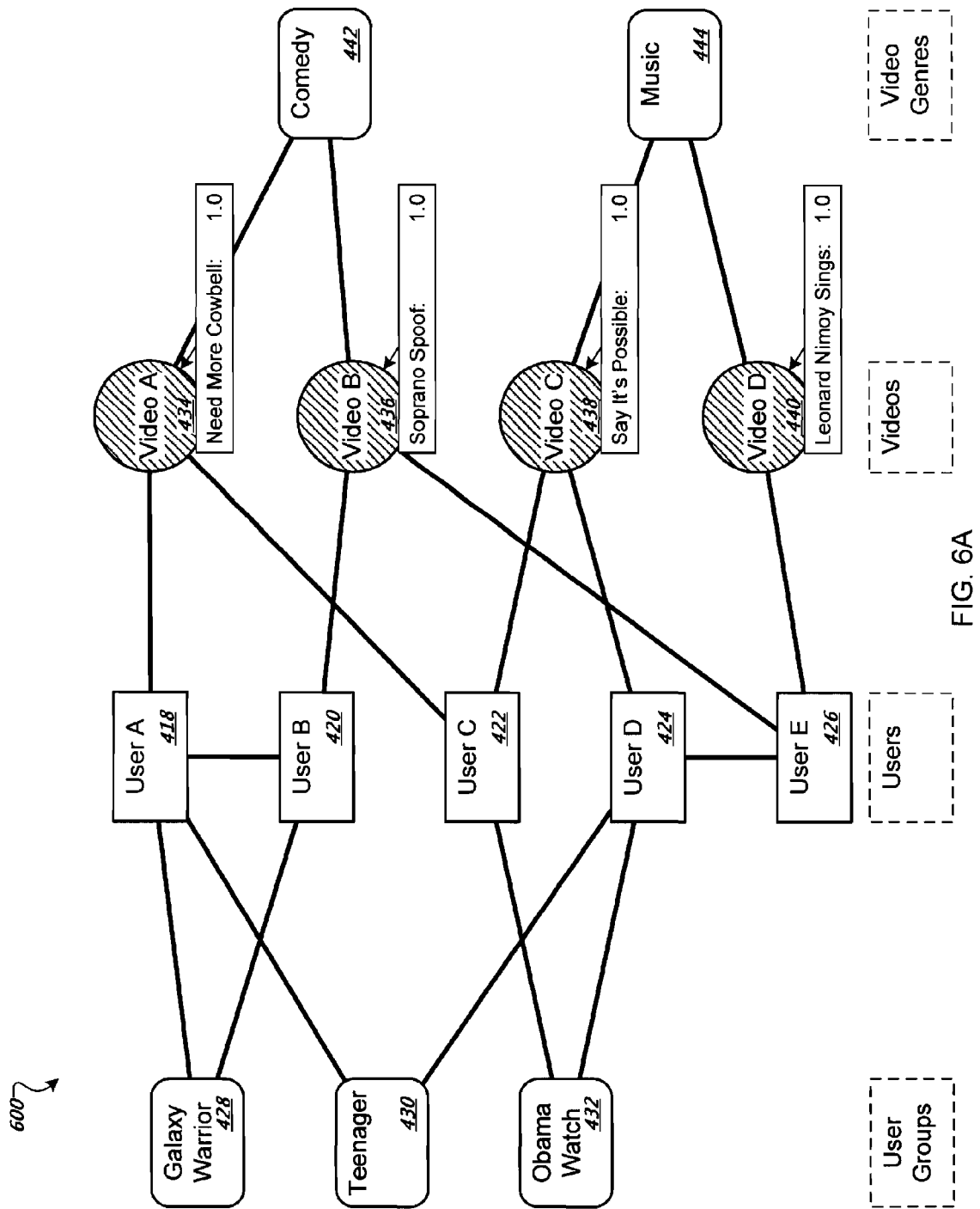

FIG. 6A shows a graph 600 that includes five user nodes, each of which represents a user of a social network system. The graph 600 also includes four video nodes, three user group nodes, and two genre nodes. In some implementations, the data structure generator 220 generates the user nodes, the user group nodes, and the video nodes based on content from user profiles, user activity, and user video history. In some implementations, the relationship determination module 222 determines edges among user nodes, user group nodes, and video nodes also based on content from user profiles, user activity, and user video history.

In additional implementations, the classifying module 224 classifies videos into genres, which are also represented by nodes. Edges between video and genre nodes can indicate which videos are associated with which genres. In a first step of a label inferring process, initial labels and values are assigned to "injection" nodes that are used in labeling the other nodes in the graph 600. In the example shown in the graph 600, the video nodes 434, 436, 438, and 440 are the injection nodes. The inferred label generator 204, for example, assigns the labels "Need More Cowbell," "Soprano Spoof," "Say It's Possible," and "Leonard Nimoy Sings" to the video nodes 434, 436, 438, and 440, respectively, each with a value of 1.0.

In some implementations, initial values at injection nodes are static. That is, the static values do not change as label values propagate from node to node. In this example, the video labels "Need More Cowbell," "Soprano Spoof," "Say It's Possible," and "Leonard Nimoy Sings" propagate from the video nodes to the other node types.

For brevity of presentation, not all label values are discussed or shown in FIGS. 6B-6D and 7B-7D. Although, all of the label values may be calculated using a method such as the adsorption algorithm 500 described with respect to FIG. 5.

Figure 6B:
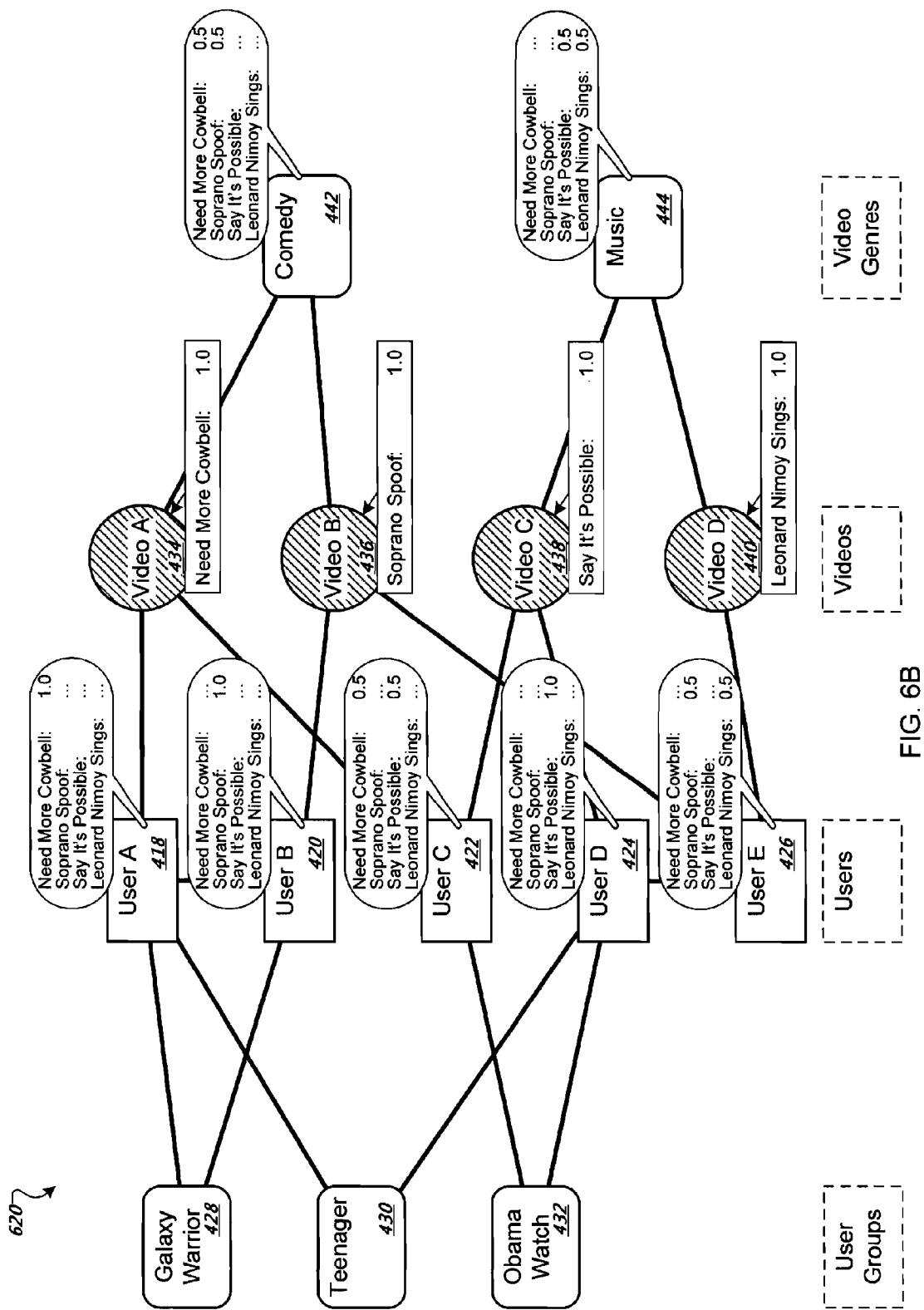

FIG. 6B shows an example of a graph 620 for inferring video labels. The graph 620 is the graph of FIG. 6A after a first iteration of inferring video labels. After the first iteration, the label values propagate from the video nodes to the user nodes. In particular, the user node 418 now has a "Need More Cowbell" label value of 1.0. The user node 420 has a "Soprano Spoof" label value of 1.0. The user node 422 receives "Need More Cowbell" and "Say It's Possible" label values of 1.0 from the video nodes 434 and 438, respectively.

In this example, the label values are normalized after every iteration so that the sum of all the label values for a particular node equal 1.0. For example, the label values for the user node 422 are normalized so that each of the "Need More Cowbell" and "Say It's Possible" labels contribute 0.5. The user node 424 has a "Say It's Possible" label value of 1.0. The user node 426 has normalized "Soprano Spoof" and "Leonard Nimoy Sings" label values of 0.5. The user label values at this iteration are due to the edges between the user nodes and the video nodes.

The video labels are also propagated to the genre nodes 442 and 444. In particular, the genre node 442 now has normalized "Need More Cowbell" and "Soprano Spoof" video label values of 0.5. The genre node 444 has normalized "Say It's Possible" and "Leonard Nimoy Sings" video label values of 0.5. The genre label values at this iteration are due to the edges between the genre nodes and the video nodes.

During the initial iteration, the inferred label generator assigns the label values to the user nodes and the genre nodes based on the label values of the video nodes. The remaining label values for the nodes not discussed remain null (e.g., not yet evaluated) in this example.

FIG. 6C shows the graph of FIG. 6A after a second iteration of the algorithm. FIG. 6C includes an example of a graph 640. In this example, the user nodes are assigned label values based on neighboring user nodes. In addition, user groups are assigned label values based on neighboring nodes, which are limited to user nodes in this figure. For example, the inferred label generator can add a "Soprano Spoof" video label to the Abby node based on the friendship between Abby and Bob. In some implementations, the edge between Abby and Bob is unidirectional and the Abby node video labels do not contribute to the Bob node (or the contribution is discounted by a predetermined amount).

The "Galaxy Warrior" user group receives a video label value of 1.0 for "Need More Cowbell" from the Abby node. The "Galaxy Warrior" user group also receives a video label value of 1.0 for "Soprano Spoof" from the Bob node. After normalizing, the "Galaxy Warrior" label values are 0.5 for "Need More Cowbell" and 0.5 for "Soprano Spoof." The other user node label values can be modified in a substantially similar way.

In certain implementations, the nodes, such as the video nodes 434, 436, 438, and 440, are not modified. Instead, for every iteration, the nodes can provide one or more static label values that are used to modify the label values of neighboring nodes to which they are linked.

Figure 6D:
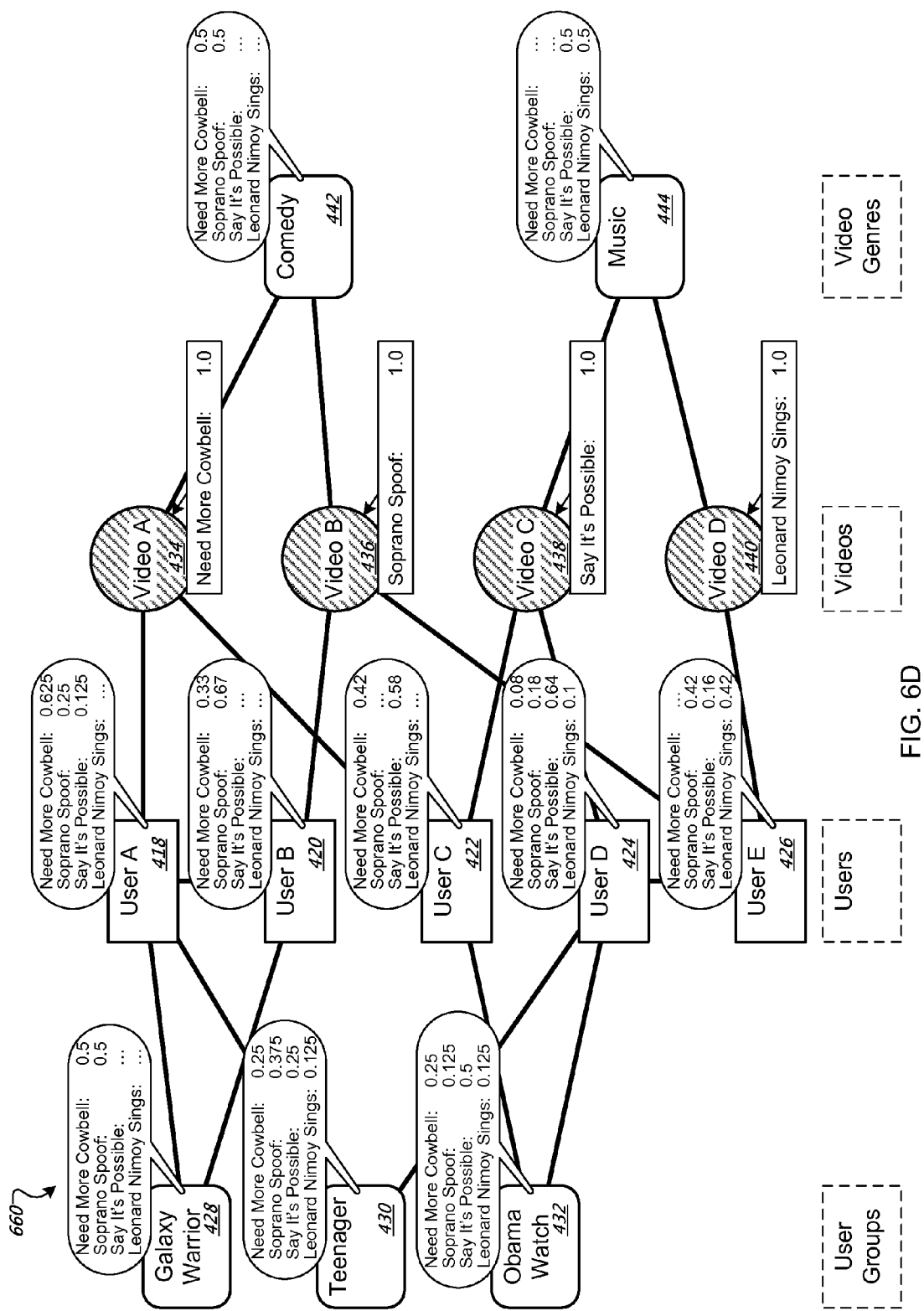

FIG. 6D shows the graph of FIG. 6A after a third iteration of the algorithm. FIG. 6D shows an example of a graph 660. The label values for each user node, user group node, and genre node continue to be modified based on neighboring nodes. For the third iteration, the Abby node receives a "Say It's Possible" video label contribution from the edge to the "Teenager" user group, the "Teenager" user group having previously received the "Say It's Possible" video label contribution from the Dale user node. Conversely, the Dale node receives "Need More Cowbell" and "Soprano Spoof" video label contributions from the "Teenager" user group. The Dale user node receives additional "Need More Cowbell" and "Say It's Possible" video label contributions from the "Obama Watch" user group, the "Obama Watch" user group having received the "Need More Cowbell" and "Say It's Possible" contributions from the Cal user node.

Figure 7A:
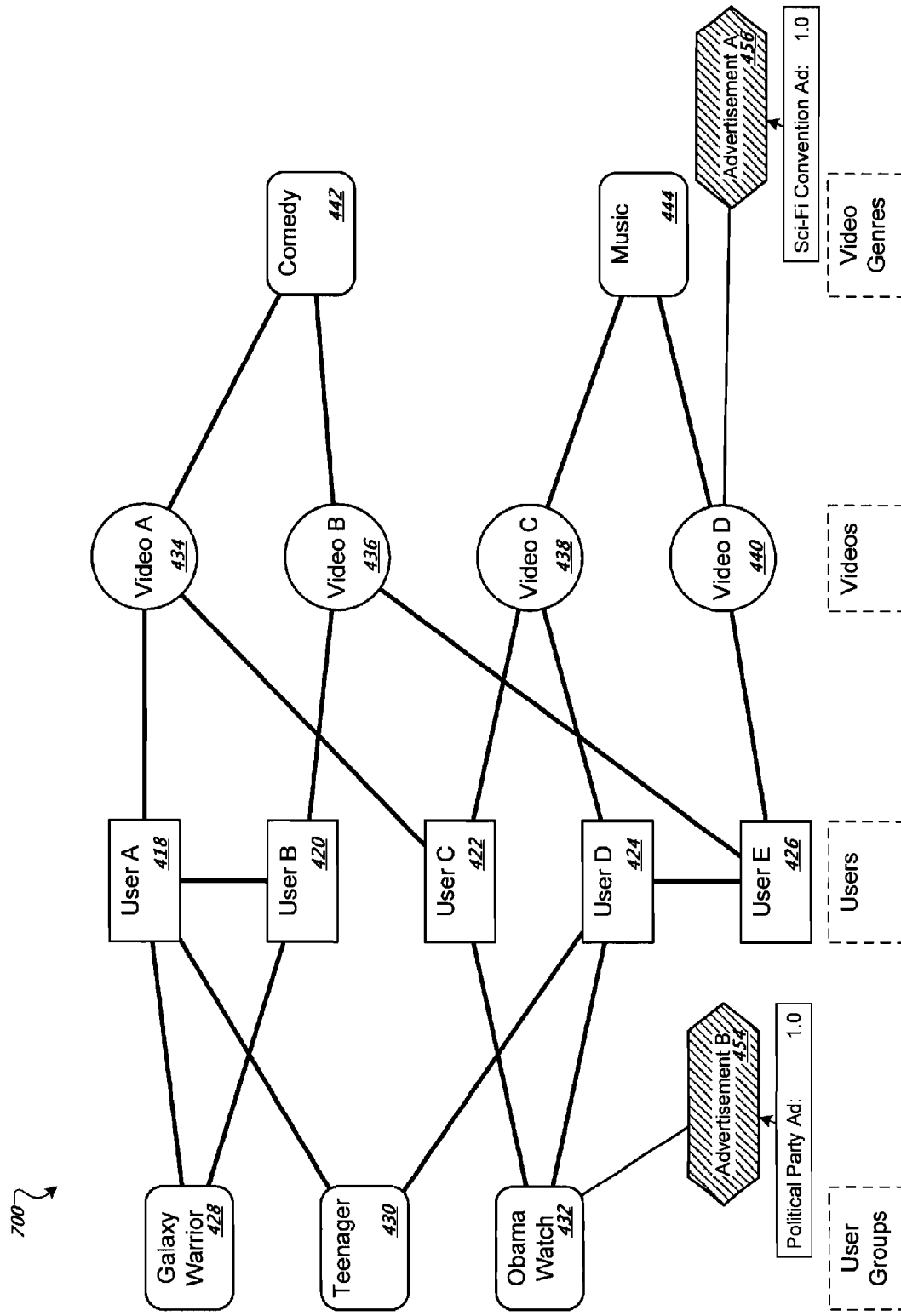
FIGS. 7A-7D show exemplary graphs of users, videos, and advertisements in a social network, where an algorithm is used to infer label values for the users.

FIG. 7A is an alternative example of a graph 700 for use in generating video-related recommendations based on relationships between users and videos. In some implementations, the graph 700 is substantially similar to the graph described in association with FIGS. 6A-6D. Unlike the graph 600, the graph 700 includes advertisement nodes as well as user nodes, user group nodes, video nodes, genre nodes, and advertisement nodes. Here, for the purpose of this example, the injection nodes are the advertisement nodes 454 and 456. That is, the advertising nodes are used as labels for the other nodes in the graph 700. Each advertising node/label can represent a particular product or service advertised (e.g., a sci-fi convention or a political party message). The nodes in the graph 700 can be linked to one another as previously described with respect to the graph 416, the graph 452, and the graph 600. The advertisement labels are propagated through the links from the advertisement nodes to the other nodes of the graph 700.

Figure 7B:
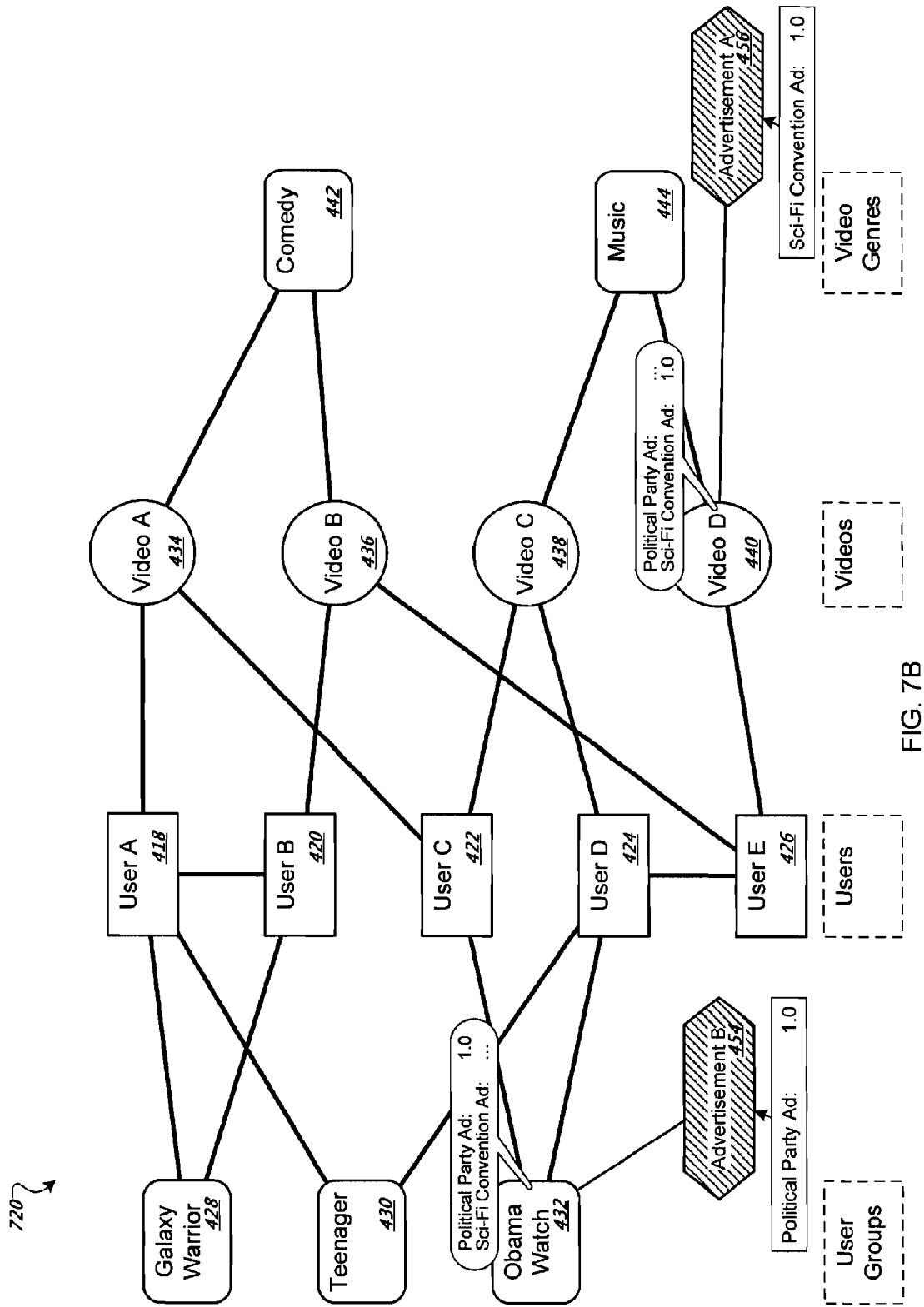

FIG. 7B is an example of a graph 720 after performing a first advertisement inferring iteration on the graph 700 of FIG. 7A. The graph 720 propagates the political party ad and sci-fi convention advertisement label values from the advertisement nodes 454 and 456 to the "Obama Watch" user group and the "Leonard Nimoy Sings" video, respectively. For example, the user group 432 receives a political party ad label value of 1.0 and the video node 440 receives a sci-fi convention ad label value of 1.0.

Figure 7C:
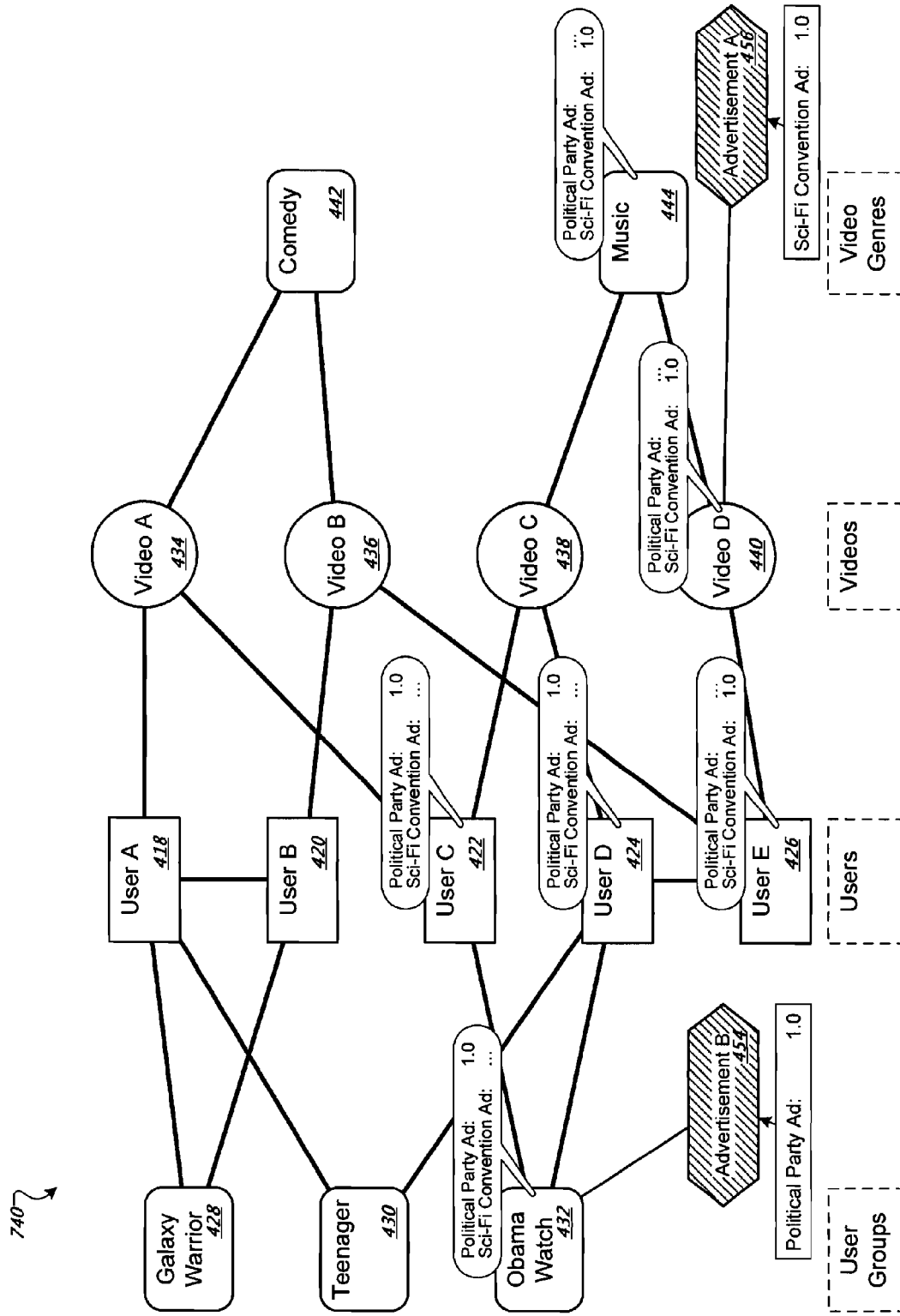

FIG. 7C is an example of a graph 740 after performing a second advertisement inferring iteration on the graph 700 of FIG. 7A. The graph 740 propagates the political party ad label values from the user group node 432 to the user nodes 422 and 424, which have edges with the use group node 432. Particularly, the user nodes 422 and 424 now have political party ad label values of 1.0. The graph 740 propagates the sci-fi convention ad label values from the video node 440 to the user node 426 and the genre node 444, which have edges with the video node 440. Particularly, the user node 426 and the genre node 444 now have sci-fi convention ad label values of 1.0.

Figure 7D:
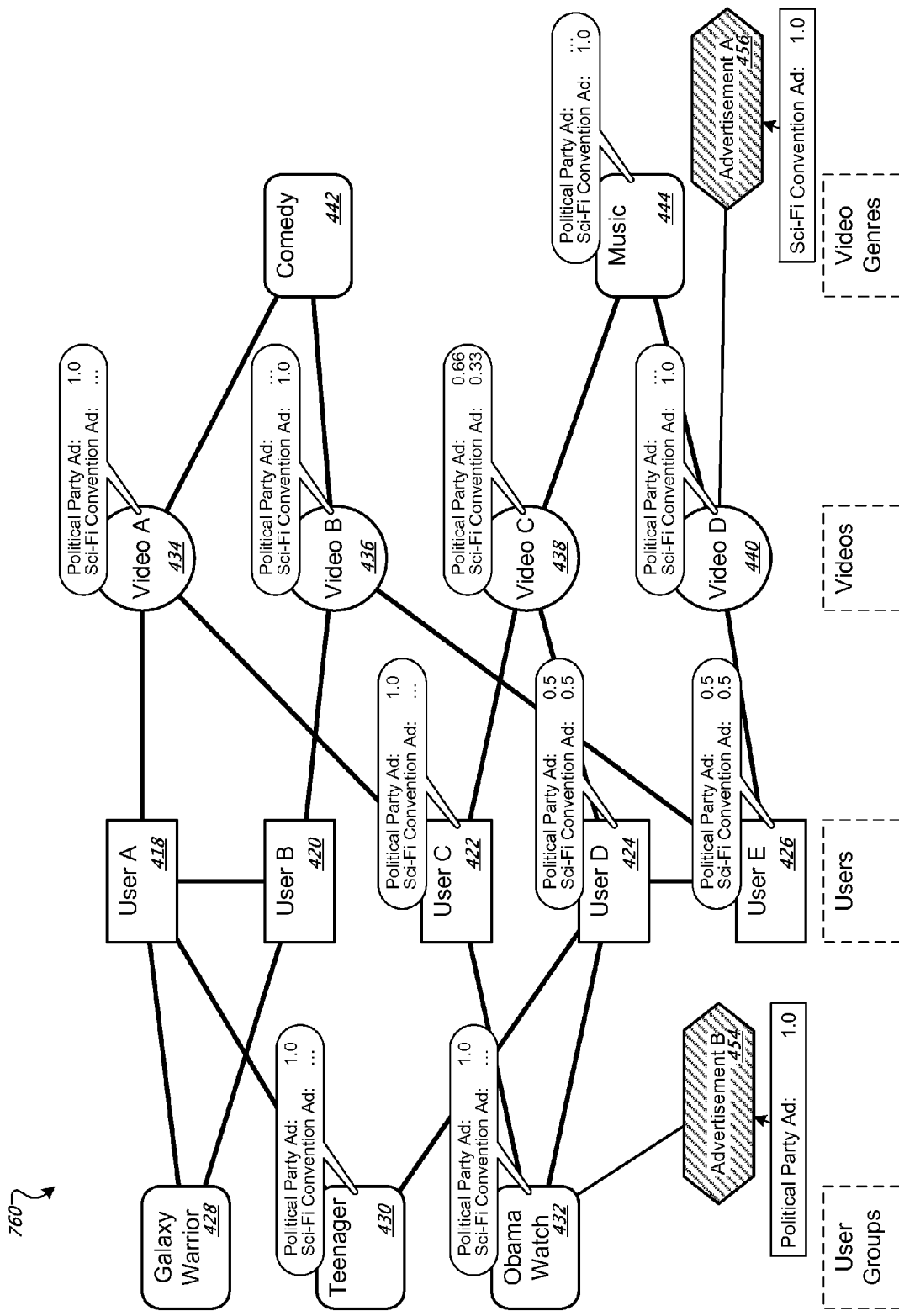

FIG. 7D is an example of a graph 760 after performing a third advertisement inferring iteration on the graph 700 of FIG. 7A. The graph 760 further propagates values for the political party and sci-fi convention ad labels among the nodes. For example, the user nodes 422 and 424 propagate a combined political party ad label value of 2.0 to the video node 438. In addition, the genre node 444 propagates a sci-fi convention ad label value of 1.0 to the video node 438. The label values of the video node 438 are subsequently normalized to 0.66 political party ad and 0.33 sci-fi convention ad.

After the ad label values converge for a particular node or a predetermined number of iterations are performed, or a minimum change in ad label value for a particular node is met, then one or ad labels for the particular node can be selected based on the ad label values. The selected ad labels can be used to generate recommendations for the entity represented by the particular node. For example, one or more of the highest ad label value(s) can be selected for a particular node. The ad(s) associated with the selected ad label(s) can be recommended for the particular node.

For example, an ad recommendation may be given for a user group node, a user node, a video node, or a genre node based on the inferred ad label values. Once the highest label value (or values) is identified and the corresponding ad is selected for recommendation, the recommended ad can be transmitted for display to or in association with an entity represented by the node. For example, a recommended ad for a user group may be presented in association with users that belong to the user group (e.g., on the member users profile page). The recommended ad can also be presented to users that belong to the user group (e.g., when the user views other web pages).

Figure 8A:
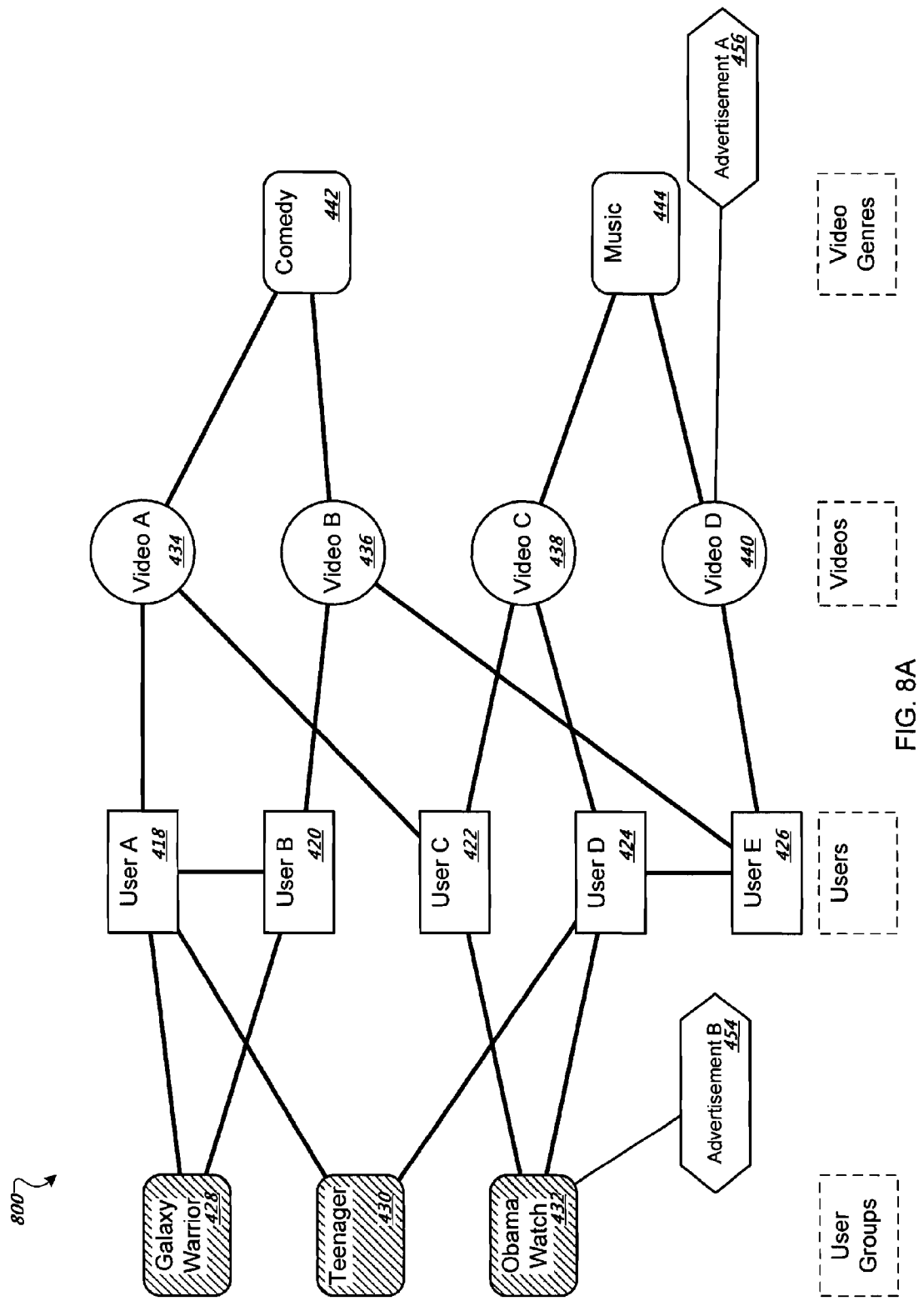
FIGS. 8A-8C are graphs where user groups, users, and video genres, respectively, are used as labels.

In another example, a recommended ad for a video may be presented to users that view the video (e.g., spliced in before, after, or during the video or presented along side the video as the video is played). In yet another example, A recommended ad for a video genre can be transmitted for display when a user views a video that is classified as being in the genre. FIG. 8A is a graph 800, where the user group nodes are used as labels. Propagating the user groups (or a subset of user groups) through the graph 800 can generate user group label values for each of the other nodes in the graph 800. This may suggest which user group is most likely to be associated with a user, video, genre, or advertisement represented by their respective nodes. Like the examples given for FIG. 7D above, the greatest user group label values for a particular node can be selected to provide recommendations. For example, if the greatest label value for a user node is associated with a user group "Obama Watch," a recommendation module can output a recommendation that a user (represented by the user node) join the Obama Watch user group.

In some implementations, a node type selected to label other node types can also label its own node type. For example, user group labels can be generated for user group nodes. In some implementations, the inferred label generator may determine which user groups are similar to each other based on the user group labels associated with a particular user group node. This, in turn, can be used to generate additional recommendations such as recommending additional user groups to members of a first user group, where the additional user groups are found to be similar to the first user group.

Figure 8B:
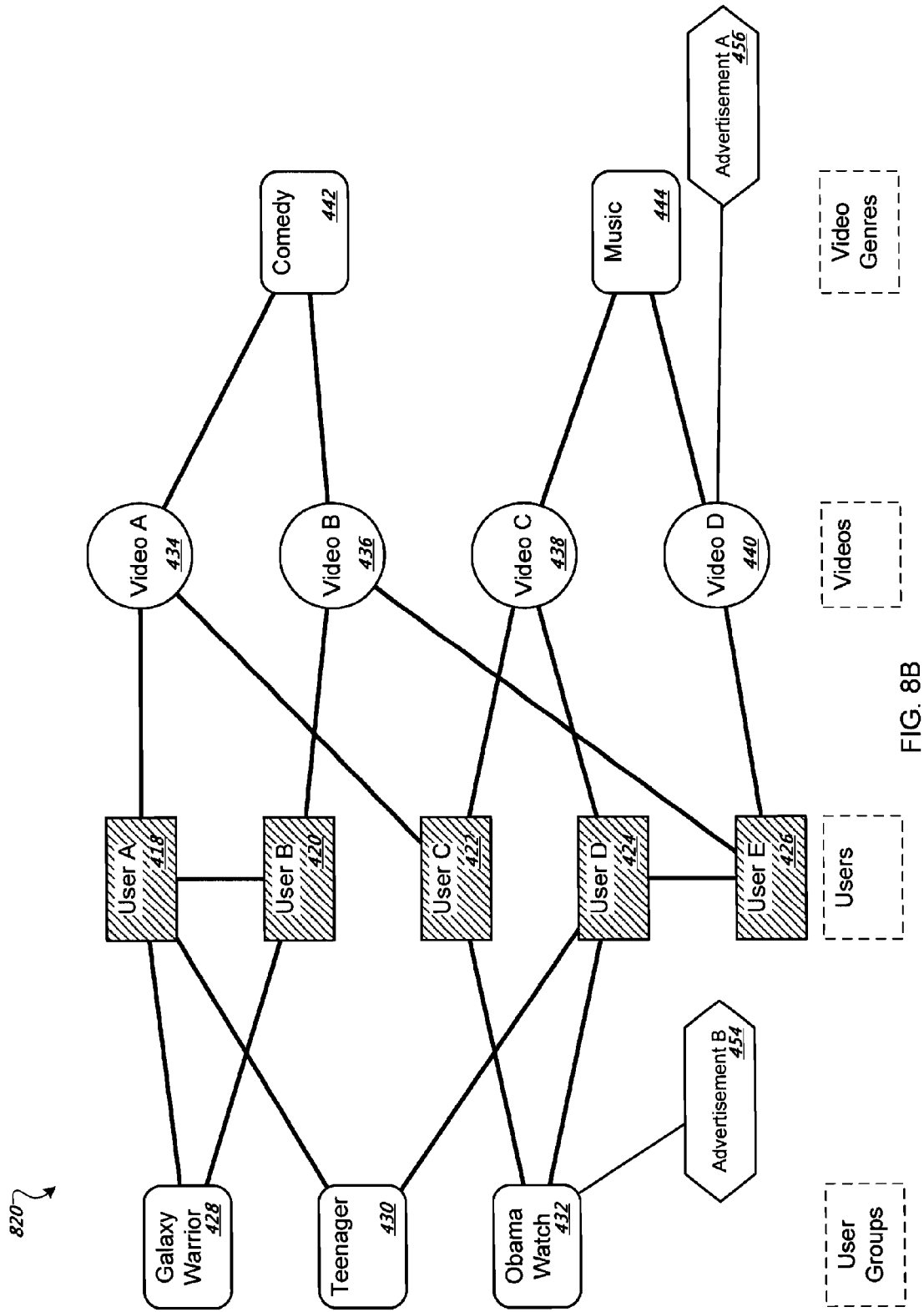

FIG. 8B is a graph 820, where the user nodes are used as labels. Propagating the user nodes (or a subset of user nodes) through the graph 820 can generate user label values for each of the other nodes in the graph 820. In some implementations, the resulting user label values may suggest which user is most likely to be associated with a user group, video, genre, or advertisement. For example, a recommendation module can select the highest user label values for a particular user group node, and generate a recommendation that a user group (represented by the user group node) recruit users associated with the selected user label values.

Additionally, if user labels are generated for user nodes, the inferred label generator may determine which users are similar to each other based on the user labels associated with a particular user node. For example, this can be used to generate recommendations to user regarding which other users they may like to meet. In another example, this can be used to generate recommendations to an advertiser to send advertisements to a first user if he or she is like a second user that selected an ad from the advertiser.

Figure 8C:
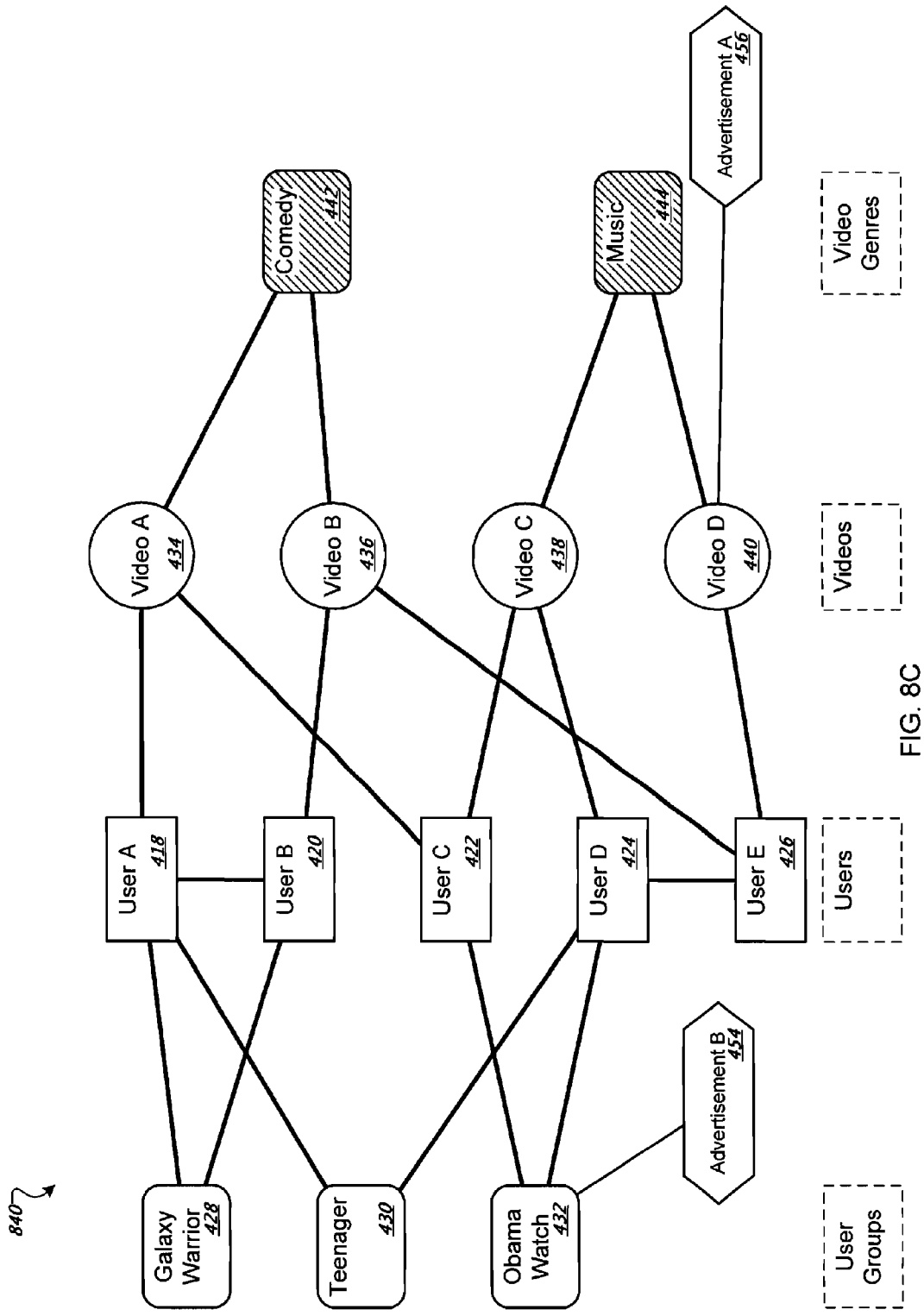

FIG. 8C is a graph 840, where the genres are used as labels. Propagating the genres (or a subset of genres) through the graph 840 can generate genre labels for each of the other nodes in the graph 840. This may suggest which genre is most likely to be associated with a user, user group, video, or advertisement, where the suggestion can be used to generate recommendations. For example, a video can be automatically classified into a genre by selecting a genre that corresponds to a highest genre label value associated with the video. The classifier module can then assign the selected genre to the video. In another example, a genre label associated with a user node can be used to generate a genre recommendation to a user. The genre recommendation also can include a recommendation for one or more videos of the recommended genre.

Figure 9:
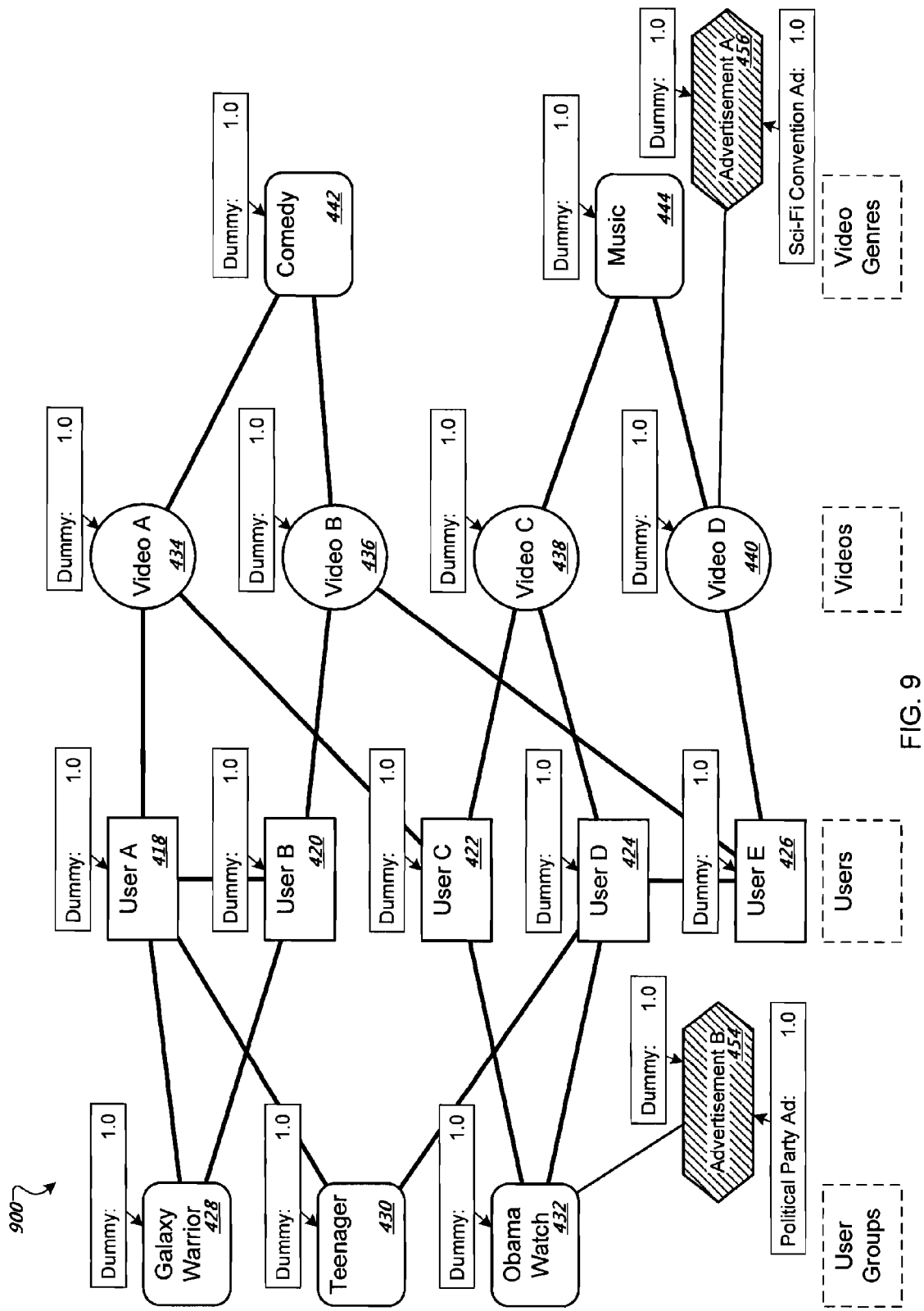
FIG. 9 is a graph that includes dummy nodes.

FIG. 9 is a graph 900 that includes dummy nodes. In certain implementations, dummy nodes can be used in the graph 900 to reduce effects of distant neighboring nodes. When the label of a node is determined based on, for example, the label with the greatest label value, the weight assigned to the dummy label can be ignored and the remaining weights used in the determination. For example, the dummy nodes' contribution can be removed from the calculation of the label values at the end of the algorithm (e.g., after the label values have reached a steady state or a specified number of iterations have occurred).

In certain implementations, dummy nodes can be used in all of the graphs generated by the inferred label generator. In other implementations, a user may specify for which graph(s) the dummy nodes may be used.

FIG. 9 shows an implementation where the dummy nodes are associated with all nodes in the graph. In other implementations, dummy nodes are assigned to a small number of nodes, such as nodes that are not associated with initial labels based on the content of user profiles, etc.

Figure 10:
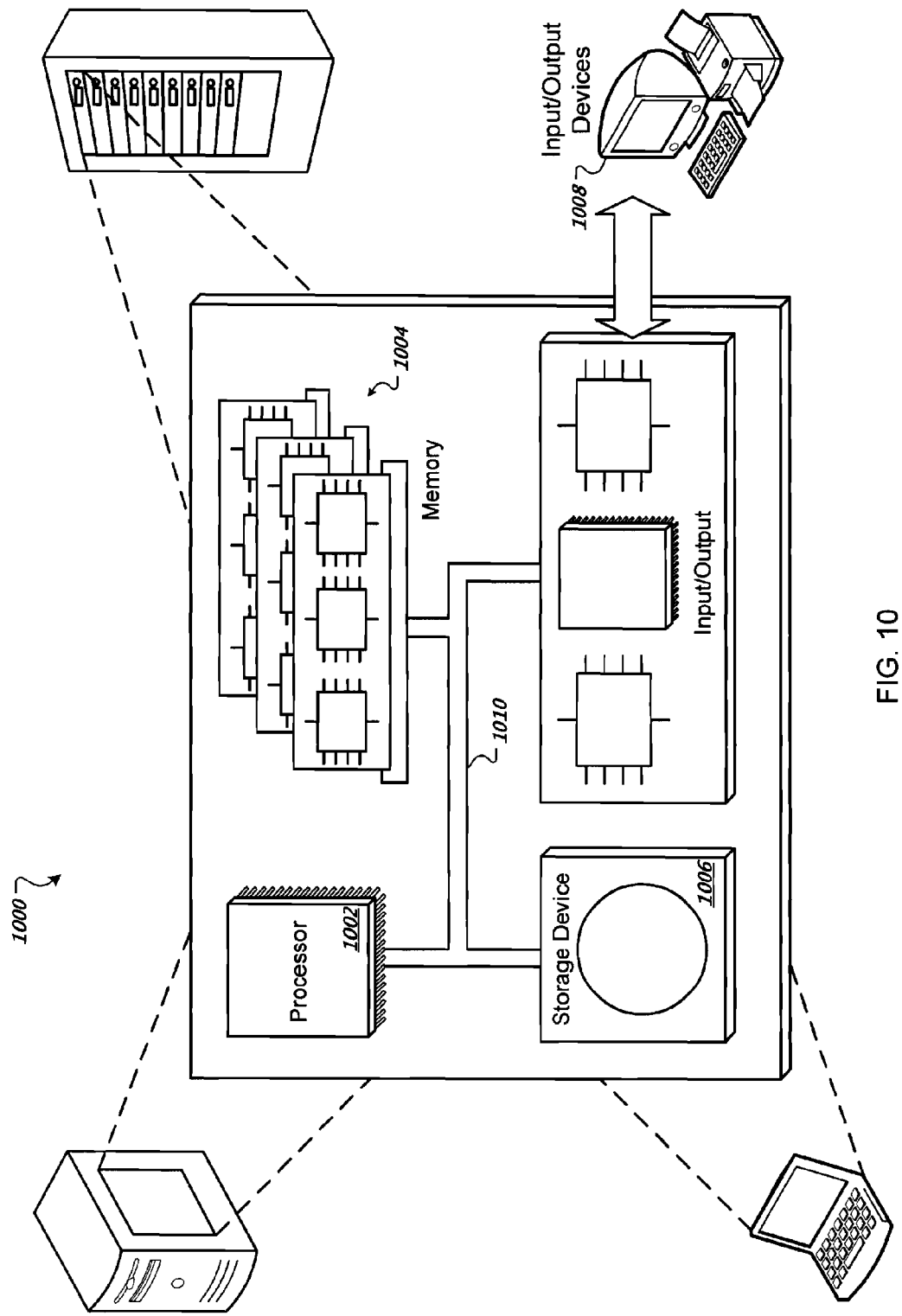
FIG. 10 is a schematic diagram of a computer system.

FIG. 10 is a schematic diagram of a generic computing system 1000. The generic computing system 1000 can be used for the operations described in association with any of the computer-implement methods described previously, according to one implementation. The generic computing system 1000 includes a processor 1002, a memory 1004, a storage device 1006, and an input/output device 1008. Each of the processor 1002, the memory 1004, the storage device 1006, and the input/output device 1008 are interconnected using a system bus 1010. The processor 1002 is capable of processing instructions for execution within the generic computing system 1000. In one implementation, the processor 1002 is a single-threaded processor. In another implementation, the processor 1002 is a multi-threaded processor. The processor 1002 is capable of processing instructions stored in the memory 1004 or on the storage device 1006 to display graphical information for a user interface on the input/output device 1008.

The memory 1004 stores information within the generic computing system 1000. In one implementation, the memory 1004 is a computer-readable medium. In one implementation, the memory 1004 is a volatile memory unit. In another implementation, the memory 1004 is a non-volatile memory unit.

The storage device 1006 is capable of providing mass storage for the generic computing system 1000. In one implementation, the storage device 1006 is a computer-readable medium. In various different implementations, the storage device 1006 may be a floppy disk device, a hard disk device, an optical disk device, or a tape device.

The input/output device 1008 provides input/output operations for the generic computing system 1000. In one implementation, the input/output device 1008 includes a keyboard and/or pointing device. In another implementation, the input/output device 1008 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, although videos and corresponding video nodes are described above, other types of media can be used in the described systems and methods. For example, graphs of FIGS. 6A-D can include nodes that represent audio, images, and text.

In addition, information used to derive relationships between the nodes can include communications between users such as emails, instant messages, and Voice over IP calls.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
   receiving, at a computer system, user information associated with users of a social network and associated with media accessed by the users;
   generating, by the computer system, a graph having nodes of a plurality of categories that are linked together by edges from the received user information, wherein the plurality of categories includes at least a first category of user nodes that represent the users of the social network and a second category of media nodes that represent the media accessed by the users;
   selecting, by the computer system, a type of label to propagate in the graph;
   iteratively propagating, by the computer system, values for labels of the selected label type through nodes of the plurality of categories in the graph using the edges that link the nodes together; and
   outputting by the computer system, the iteratively propagated values for labels of the selected label type for the nodes of the plurality of categories in the graph.

2. The method of claim 1, wherein the user information associated with the users of the social network comprises user identifiers, group identifiers for groups of users, demographic information for the users, and activity indicators that specify how active users are on the social network.

3. The method of claim 1, wherein the user information associated with the media accessed by the users includes information about videos watched by users, genres associated with the videos, advertisements (ads) selected by or displayed to users, email communications sent or received by the users, and comments posted or read by the users.

4. The method of claim 1, wherein the selected label type comprises videos watched by users.

5. The method of claim 4, wherein outputting a value of a label of the selected label type for a particular user node comprises determining a value for a particular video label associated with a particular user represented by the particular user node.

6. The method of claim 5, further comprising determining one or more videos to recommend to the particular user by identifying one or more videos labels having values for the particular user node that satisfy a threshold requirement.

7. The method of claim 1, wherein the selected label type comprises ads selected by or displayed to the users.

8. The method of claim 7, wherein outputting a value of a label of the selected label type for a particular user node comprises determining a value for a particular ad label associated with a particular user represented by the particular user node.

9. The method of claim 8, further comprising determining one or more ads to recommend for display to the particular user by identifying one or more ad labels having values for the particular user node that satisfy a threshold requirement.

10. The method of claim 7, wherein outputting a value of a label of the selected label type for a particular media node comprises determining a value for a particular ad label associated with a particular video represented by the particular media node.

11. The method of claim 10, further comprising determining one or more ads to recommend for display with the particular video by identifying one or more ad labels having values for the particular media node that satisfy a threshold requirement.

12. The method of claim 1, wherein edges that link user nodes together in the graph are derived from relationships among users represented by the user nodes, wherein the relationships comprise friendships specified on user profiles, common membership in communities or groups on the social network, common genre classifications, common ads selected by the users, common classifications inferred from demographic information specified on user profiles, inferred relationships based on a first user posting content to a second user's web page, or relationships inferred from users' access to media.

13. The method of claim 1, wherein edges that link user nodes and media nodes together in the graph are weighted based on user ratings of the media or a number of times users accessed the media, a correlation of media to a genre based on user or online database ratings, whether video media includes advertising media, a correlation of video media to advertising media based on advertisers' input or the video media authors' input, whether users list each other as friends on a social network, or how active a particular user is on the social network.

14. The method of claim 13, wherein the weighting affects a determination of the values for labels of the selected label type.

15. The method of claim 1, wherein iteratively propagating the values for the labels of the selected label type through the nodes comprises performing a random walk algorithm on the graph to determine the values for the labels of the selected label type.

16. The method of claim 1, wherein iteratively propagating the values for the labels of the selected label type through the nodes comprises performing an adsorption algorithm on the graph to determine the values for the labels of the selected label type.

17. The method of claim 1, further comprising normalizing, for a particular node, values for labels of the selected label type iteratively propagated to the particular node.

18. The method of claim 1, wherein the type of label is selected from a plurality of types of labels that are each associated with one or more categories from the plurality of categories.

19. A computer-implemented method comprising:
receiving user information associated with users of a social network and associated with videos accessed by the users;
generating a graph that links graph nodes based on relationships derived from the user information, the graph nodes comprising
user nodes representing the users,
ad nodes representing advertisements, and
video nodes representing the videos;
selecting one or more of the user, ad, or video nodes as a label to associate with the graph nodes;
wherein the user nodes make up a user node group, the ad nodes make up an ad node group, and the video nodes make up a video node group, and at least some of the nodes in one of the groups are linked by edges in the graph to other of the nodes in another of the groups; and
outputting, for a first graph node, a first label value for the label associated with the particular graph node based on one or more second label values for the label that are associated with neighboring graph nodes that are linked to the particular graph node.

20. A system comprising:
one or more servers;
an interface to the one or more servers that is configured to receive social network information associated with users of a social network and media accessed by the users;
one or more processors of the one or more servers that are configured to execute instructions; and
a computer-readable storage medium accessible to the one or more servers that is configured to store instructions, wherein execution of the stored instructions by the one or more processors causes the one or more servers to:
generate a graph having nodes of a plurality of categories that are linked together by edges from the social network information, wherein the plurality of categories includes at least a first category of user nodes that represent the users of the social network and a second category of media nodes that represent the media accessed by the users;
select a type of label to propagate in the graph;
iteratively propagate values for labels of the selected label type through nodes of the plurality of categories in the graph using the edges that link the nodes together; and
output the iteratively propagated values for labels of the selected label type for the nodes of the plurality of categories in the graph.

21. A computer-implemented method comprising:
identifying, by a computer system, a relationship between a first user and a second user of a social network using a graph having nodes of a plurality of categories that are linked together by edges, wherein the plurality of categories includes at least a first category of user nodes that represent the users of the social network and a second category of media nodes that represent the media accessed by the users, and wherein a first node representing the first user is linked to a second node representing the second user by an edge in the graph;
associating, by the computer system, first information used to target advertising with the first node based on actions or content generated by the first user at one or more systems external to the social network, wherein at least some of the first information is associated with the first node by an edge linking a media node to the first node, wherein the first information comprises one or more labels that are selected for propagating in the graph and that have values that are propagated in the graph through the nodes of the graph using the edges that link the nodes together;
inferring, by the computer system based on the first information and the relationship, second information used to target advertising to the second user of the social network; and
outputting, by the computer system, an advertisement for the second user based on the inferred second information.

22. The method of claim 21, wherein the relationship includes a friendship relationship.

* * * * *